(12) United States Patent
Schmidt et al.

(10) Patent No.: US 8,645,168 B2
(45) Date of Patent: Feb. 4, 2014

(54) INTERACTIVE ELECTRONIC BILL PAYMENT SYSTEM

(75) Inventors: Mike Schmidt, Etobicoke (CA); Ilan Grosman, Thornhill (CA); David Johnston, Toronto (CA)

(73) Assignee: Emergis Inc., Calgary, Alberta (CA)

( * ) Notice: Subject to any disclaimer, the term of this patent is extended or adjusted under 35 U.S.C. 154(b) by 183 days.

(21) Appl. No.: 11/797,316

(22) Filed: May 2, 2007

(65) Prior Publication Data

US 2007/0203760 A1 Aug. 30, 2007

Related U.S. Application Data

(63) Continuation of application No. 10/960,984, filed on Oct. 12, 2004, now abandoned, which is a continuation of application No. 10/656,265, filed on Sep. 8, 2003, now abandoned, which is a continuation-in-part of application No. 10/277,205, filed on Oct. 22, 2002, now Pat. No. 8,108,274.

(60) Provisional application No. 60/408,884, filed on Sep. 9, 2002.

(30) Foreign Application Priority Data

Sep. 6, 2002 (CA) ...................................... 2401956
Oct. 21, 2002 (CA) ...................................... 2409078

(51) Int. Cl.
*G06Q 40/00* (2012.01)
*G06F 17/00* (2006.01)

(52) U.S. Cl.
USPC ................................................. 705/4; 705/40

(58) Field of Classification Search
USPC ......................................... 705/21, 35, 37, 40
See application file for complete search history.

(56) References Cited

U.S. PATENT DOCUMENTS 6,721,716 B1 * 4/2004 Gross .............................. 705/40
2002/0002495 A1 * 1/2002 Ullman ........................... 705/21

* cited by examiner

*Primary Examiner* — Garcia Ade
(74) *Attorney, Agent, or Firm* — Grant Tisdall; Gowling Lafleur Henderson LLP

(57) ABSTRACT

A system for coordinating the submission and processing of a bill according to predictive payment data of a plan. The system comprises a provider interface and an integrated database for receiving a predictive payment plan submitted from the provider interface. The system also has a predictive payment request of the plan storable in the database, the request including a plurality of predictive payment parameters. An adjudication engine is coupled to the integrated database, and an insertion function is used for inserting the predictive payment parameters into an adjudication rule set of the adjudication engine. The adjudication rule set is used for eventual adjudication of the predictive payment data, wherein adjudication of the predictive payment data results in the generation of the bill. The system also has a workflow engine for coordinating the processing of the electronic bill and for updating the bill information in response to processing.

20 Claims, 29 Drawing Sheets

Figure 5A

| BCE Emergis | SUBMIT PAYMENT | VOID PAYMENT | BILL PAYMENT STATUS | BILL SUBMISSION | BILL / PAYMENT INQUIRY |

Provider Information  
Provider Number : P111 —87  Health Payment Request Confirmation  Invoice Reference # : 1234 May

Claim Information :  
Claim Number : C111 —89  
Patient Surname : PS111  Date of Birth : 02-May-1902  
Patient Given Name : PG111  Date of Accident : 02-May-2002 —91

Bill Line Items

| No. | Service Code | Modifier | ICD-9 | Date of Service | POS | Type | Units | Charges |
|---|---|---|---|---|---|---|---|---|
| 1 | SSCode-111 | Code:111 | Code:111 | 03/04/2002 | Code:111 | Health | 1 | $ 18.74 |
| 2 | SSCode-111 | Code:111 | Code:111 | 05/04/2002 | Code:111 | Health | 1 | $ 18.74 |
| 3 | SSCode-111 | Code:111 | Code:111 | 07/04/2002 | Code:111 | Health | 1 | $ 18.74 |
| 4 | SSCode-111 | Code:111 | Code:111 | 09/04/2002 | Code:111 | Health | 1 | $ 18.74 |
| 5 | SSCode-111 | Code:111 | Code:111 | 11/04/2002 | Code:111 | Health | 1 | $ 18.74 |
| 6 | SSCode-111 | Code:111 | Code:111 | 13/04/2002 | Code:111 | Health | 1 | $ 18.74 |
| 7 | SSCode-111 | Code:111 | Code:111 | 15/04/2002 | Code:111 | Health | 1 | $ 18.74 |
| 8 | SSCode-111 | Code:111 | Code:111 | 17/04/2002 | Code:111 | Health | 1 | $ 18.74 |
| 9 | SSCode-111 | Code:111 | Code:111 | 19/04/2002 | Code:111 | Health | 1 | $ 18.74 |
| 10 | SSCode-111 | Code:111 | Code:111 | 21/04/2002 | Code:111 | Health | 1 | $ 18.74 |
| 11 | SSCode-111 | Code:111 | Code:111 | 23/04/2002 | Code:111 | Health | 1 | $ 18.74 |
| 12 | SSCode-111 | Code:111 | Code:111 | 25/04/2002 | Code:111 | Health | 1 | $ 18.74 |
| 13 | SSCode-111 | Code:111 | Code:111 | 27/04/2002 | Code:111 | Health | 1 | $ 18.74 |
| 14 | SSCode-111 | Code:111 | Code:222 | 03/05/2002 | Code:111 | Health | 1 | $ 20.00 |
| 15 | SSCode-111 | Code:111 | Code:222 | 05/05/2002 | Code:111 | Health | 1 | $ 20.00 |
| 16 | SSCode-111 | Code:111 | Code:222 | 07/05/2002 | Code:111 | Health | 1 | $ 20.00 |
| 17 | SSCode-111 | Code:111 | Code:222 | 09/05/2002 | Code:111 | Health | 1 | $ 20.00 |
| 18 | SSCode-111 | Code:111 | Code:222 | 11/05/2002 | Code:111 | Health | 1 | $ 20.00 |
| 19 | SSCode-111 | Code:111 | Code:222 | 13/05/2002 | Code:111 | Health | 1 | $ 20.00 |

Figure 5B

| | | | | | | |
|---|---|---|---|---|---|---|
| 20 | SSCode - 111 | Code : 111 | 15 / 05 / 2002 | Code : 222 | Health | 1 | $ 20.00 |
| 21 | SSCode - 111 | Code : 111 | 17 / 05 / 2002 | Code : 222 | Health | 1 | $ 20.00 |
| 22 | SSCode - 111 | Code : 111 | 19 / 05 / 2002 | Code : 222 | Health | 1 | $ 20.00 |
| 23 | SSCode - 111 | Code : 111 | 21 / 05 / 2002 | Code : 222 | Health | 1 | $ 20.00 |
| 24 | SSCode - 111 | Code : 111 | 23 / 05 / 2002 | Code : 222 | Health | 1 | $ 20.00 |
| 25 | SSCode - 111 | Code : 111 | 25 / 05 / 2002 | Code : 222 | Health | 1 | $ 20.00 |
| 26 | SSCode - 111 | Code : 111 | 27 / 05 / 2002 | Code : 222 | Health | 1 | $ 20.00 |
| 27 | SSCode - 111 | Code : 111 | 29 / 05 / 2002 | Code : 222 | Health | 1 | $ 20.00 |
| 28 | SSCode - 111 | Code : 111 | 31 / 05 / 2002 | Code : 222 | Health | 1 | $ 20.00 |

Total Charges : $ 543.62

Submit for Payment
It is an offence to deliberately make false statements to Workplace Safety & Insurance Board.
I hereby certify that the information being submitted is true correct and complete.

SUBMIT          EXIT

Figure 10

| CREATE LMR REFERRAL | RETRIEVE LMR REFERRAL | RETRIEVE LMR PACKAGE | PBAS HOME | EXCEPTIONS MANAGEMENT | LMR PLAN MANAGEMENT | CLAIM / PAYMENT INQUIRY |

WORKER DETAILS | EMPLOYMENT PROFILE | NCM REVIEW | REFERRAL DETAILS | LMR PROVIDER DETAILS

Referral ID : 1111
Referral Status : Pending
Date Sent :
Date Accepted :

Claim # : 1045
Worker Name (last) : Sing
Worker Name (first) : Sarah
Date of Accident : 04 / 04 / 2000
(mm / dd / yyyy)

Address : 77 Sarasota Street

Telephone : 416-555-1234
Gender : Female
Date of Birth : 10 / 06 / 1971
First Language : [English ▼]
Interpreter : ☐

City : Sussex
Postal Code : S1S 6S6

% Permanant Disability : 0
% NEL : 5

Injury / Diagnosis : ☐

If Applicable
Worker's Representative : ☐    Telephone Number : ☐

( SAVE )  ( SUBMIT )  ( EXIT )  ( PRINT VIEW )

Figure 11

| CREATE LMR REFERRAL | RETRIEVE LMR REFERRAL | RETRIEVE LMR PACKAGE | PBAS HOME | EXCEPTIONS MANAGEMENT | LMR PLAN MANAGEMENT | CLAIM / PAYMENT INQUIRY |

| WORKER DETAILS | EMPLOYMENT PROFILE | PHYSICAL PRECAUTIONS | REFERRAL DETAILS | LMR PROVIDER DETAILS |

Referral ID : 1111
Referral Status : Pending
Date Sent :
Date Accepted :

Claim # : 1045
Worker Name (last) : Sing
Worker Name (first) : Sarah
Date of Accident : 513

Pre-Injury NOC : 121
Pre-Injury Job Title : Clerical Supervisor
Pre-Injury Hourly Wage : 10
Pre-Injury Hours per Week : 40
Gross Escalated
Pre-Accident Earnings :

Employment Type : Full time
If 'Other', Specify :
Weekly WSIB Benefits : 345
Pre-90 Target Wage :

Accident Employer : BCE Emergis
Telephone : 416-223-4444
Fax : 905-232-1245
Contact Person : Peter Wilson
Contact Person Telephone : 416-222-4423
Return to work Negotiations? ☑
(With Accident Employer)

Firm : 111
Address : 5090 Explorer Drive
City : Mississauga
Postal Code : M2J 1K3

WSIB Mediation Services Used ? ☐

( SAVE )    ( SUBMIT )    ( EXIT )    ( PRINT VIEW )

Figure 12

| CREATE LMR REFERRAL | RETRIEVE LMR REFERRAL | RETRIEVE LMR PACKAGE | PBAS HOME | EXCEPTIONS MANAGEMENT | LMR PLAN MANAGEMENT | CLAIM / PAYMENT INQUIRY |

| WORKER DETAILS | EMPLOYMENT PROFILE | PHYSICAL PRECAUTIONS | REFERRAL DETAILS | LMR PROVIDER DETAILS |

Referral ID : 1111      Claim # : 1045
Referral Status : Pending      Worker Name (last) : Sing
Date Sent :      Worker Name (first) : Sarah
Date Accepted :      Date of Accident : 04 / 04 / 2000
    (mm / dd / yyyy)

Activities / Precautions (Related to Compensable Permanent Impairments). Check all that apply

| Lifting ☐ | Carrying ☑ | Pushing ☐ | Sitting ☐ | Standing ☐ |
| Walking ☐ | Kneeling ☐ | Crouching ☐ | Crawling ☐ | Fingering ☐ |
| Gripping ☐ | Psychological ☐ | Bending ☑ | Pulling ☐ | Handling ☑ |

Reaching : [Select one of the values ▼]

Precautions discussed with Worker. ☐    Climbing : [Select one of the values ▼]

Source of Precautions:      Date Discussed : [          ]

Details of above Precautions:

```
Pushing / Pulling - not against resistance; no repetitive movements
Handling - no heavy weights (i.e. 10kg+)
```

NCM Name : [Betty Boo]      NCM Desk : [          ]

Telephone Number : [416-344-2222]

( SAVE )   ( SUBMIT )   ( EXIT )   ( PRINT VIEW )

Figure 13

| CREATE LMR REFERRAL | RETRIEVE LMR REFERRAL | RETRIEVE LMR PACKAGE | PBAS HOME | EXCEPTIONS MANAGEMENT | LMR PLAN MANAGEMENT | CLAIM / PAYMENT INQUIRY |

| WORKER DETAILS | EMPLOYMENT PROFILE | PHYSICAL PRECAUTIONS | REFERRAL DETAILS | LMR PROVIDER DETAILS |

Referral ID : 1111  
Referral Status : Pending  
Date Sent :  
Date Accepted :

Claim # : 1045  
Worker Name (last) : Sing  
Worker Name (first) : Sarah  
Date of Accident : 04 / 04 / 2000  
(mm / dd / yyyy)

LMR Assessment Required : ☑  
French Services : ☐  
Warning : ☐  
Referral discussed with worker : ☐

Out of Province : [Select one of the values ▼]  
Prior VR / LMR Services : ☐  
Relevant Legislation : Bill 99

Additional Details :  
ESRTW Outcome :  
- Adj. contacted employer to arrange modified work on 2 Aug 00  
- A/E unable to accommodate working during preformances; Advised of LMR referral. A/E understood Adjudicator Information :  
    Name : Mat Rosi  
    Desk ID : MF001  
    Office : Small Business Telephone : 416-344-1000  
Sector : Small Business ( SAVE )  ( SUBMIT )  ( EXIT )  ( PRINT VIEW )

Figure 14

| CREATE LMR REFERRAL | RETRIEVE LMR PACKAGE | PBAS HOME | EXCEPTIONS MANAGEMENT | LMR PLAN MANAGEMENT | CLAIM / PAYMENT INQUIRY |

| WORKER DETAILS | EMPLOYMENT PROFILE | PHYSICAL PRECAUTIONS | REFERRAL DETAILS | LMR PROVIDER DETAILS |

Referral ID : 1112
Referral Status : Pending
Date Sent :
Date Accepted :

Name Provider : nrcs
Case Manager Name (last) :
Case Manager Name (first) :

Claim # : 1045
Worker Name (last) : Sing
Worker Name (first) : Sarah
Date of Accident : 04 / 04 / 2000
(mm / dd / yyyy)

Case Manager Tel :
Fax :

LMR Package Target Due Date : (30 Days After Referral Acceptance)
LMR Package Proposed Due Date :
Explanation for Due Date Revision :

( EDIT )  ( SUBMIT )  ( EXIT )  ( PRINT VIEW )

Figure 16

| VIEW NOTIFICATIONS | RETRIEVE LMR REFERRAL | ASSESSMENT | CEW | RETRIEVE LMR PACKAGE | VIEW PAYMENTS | PBAS HOME | LMR PLAN MANAGEMENT |

PLAN HEADER | PLAN DETAIL

Plan ID : 1112_1
Plan Status : Pending
Date Submitted :
(mm / dd / yyyy)
Date Approved :
(mm / dd / yyyy)

Claim # : 1045
Worker Name (last) : Sing
Worker Name (first) : Sarah
Date of Birth : 06 / 10 / 1971
(mm / dd / yyyy)
Date of Accident : 04 / 04 / 2000
(mm / dd / yyyy)

Provider : nrcs
Case Manager (last) : [Short]
Case Manager (last) : [Fem]

Case Manager Telephone: [905-222-1123]
Fax : [ ]

Pre-Injury Noc : 121
Pre-Injury Job Title : Clerical Supervisors
Pre-Injury Hourly Wage : $ 10.00
Pre-Injury Hours per Week : 40.00

Weekly WSIB Benefit Payments : $
Gross Escalated Pre Accident Earnings :
Pre-90 Target Wage : $ SEB ( NOC ) Code : [145]
SEB : [Library, Corresponden]

SEB Hourly Wage : $ [8.97]
SEB Hours per Week : [40]

Plan Start Date :
(mm / dd / yyyy)
Plan End Date :
(mm / dd / yyyy)

Adjudicator Desk : MF001

Total Plan Cost : $ ( SAVE )  ( SUBMIT )  ( EXIT )  ( PRINT VIEW )

Figure 17A

| | VIEW NOTIFICATIONS | PLAN DETAIL | ASSESSMENT | RETRIEVE LMR REFERRAL | CEW | RETRIEVE LMR PACKAGE | VIEW PAYMENTS | PBAS HOME | LMR PLAN MANAGEMENT |

PLAN HEADER

Plan Status: Pending
Plan Start Date: 23/10/2000
(mm / dd / yyyy)
Plan End Date: 13/04/2001
(mm / dd / yyyy)
Total Plan Cost: $ 27000.00
Plan ID: 1112_2

Claim #: 1045
Worker Name (last): Sing
Worker Name (first): Sarah
Date of Accident: 04 / 04 / 2000

| No. | Expense | SSP | Amount ($) | Start Date:<br>(mm / dd / yyyy) | End Date:<br>(mm / dd / yyyy) | Delete |
|---|---|---|---|---|---|---|
| 1 | LMR-Provider Travel (x | nrcs | 10800.00 | 10/23/2000 | 04/13/2001 | ☐ |
| 2 | LMR-Urban Transit | worker | 408.00 | 10/23/2000 | 04/13/2001 | ☐ |
| 3 | LMR-Supplies - Educati | worker | 300.00 | 10/23/2000 | 04/13/2001 | ☐ |
| 4 | LMR-Provider Monitorin | nrcs | 1620.00 | 10/23/2000 | 04/13/2001 | ☐ |
| 5 | LMR-Provider Mileage | nrcs | 102.00 | 10/23/2000 | 04/13/2001 | ☐ |
| 6 | LMR-Meals (max.per c | worker | 270.00 | 10/23/2000 | 04/13/2001 | ☐ |
| 7 | | | | | | ☐ |
| 8 | | | | | | ☐ |
| 9 | | | | | | ☐ |
| 10 | | | | | | ☐ |

Figure 19

| PLAN HEADER | PLAN DETAIL | ASSESSMENT | CEW | RETRIEVE LMR REFERRAL | RETRIEVE LMR PACKAGE | VIEW PAYMENTS | VIEW NOTIFICATIONS | PBAS HOME | LMR PLAN MANAGEMENT |

Education / Training : $ 0
Support Services : $ 0
Supplies and Equipment : $ 600
Assessments / Evaluations : $ 0
Provider Related : $ 25,044
Travel Related : $ 1,356
Miscellaneous : $ 0

All Projected LMR Plan Costs : $ 54,000

Projected Benefit Costs During LMR Plan : $ 8,280

Projected Weekly Benefits : $ 337.26
Projected Yearly Benefits : $ 17,537.7
Years of Projected Benefits After Completion of LMR Plan : 36

All Projected LMR Plan Costs : $ 631,357.04

GRAND TOTAL : $ 693,637.04
Cost if No LMR : $ 446,313.17

( EDIT ) ( SUBMIT ) ( EXIT ) ( PRINT VIEW )

Figure 20

| | VIEW NOTIFICATIONS | RETRIEVE LMR REFERRAL | RETRIEVE LMR PACKAGE | | PBAS HOME | LMR PLAN MANAGEMENT |
| --- | --- | --- | --- | --- | --- | --- |

| PLAN HEADER | PLAN DETAIL | ASSESSMENT | CEW | VIEW PAYMENTS |

| No. | Expense | Secondary Service Provider | Amount Approved | Paid Amount |
| --- | --- | --- | --- | --- |
| 1. | LMR - Provider Travel (x hrs @ $45/hr) | nrcs | 10,800 | |
| 2. | LMR - Urban Transit | worker | 408 | |
| 3. | LMR - Supplies - Educational and/or Training | worker | 300 | |
| 4. | LMR - Provider Monitoring (x hrs @ $90/hr) | nrcs | 1,620 | |
| 5. | LMR - Provider Mileage | nrcs | 102 | |
| 6. | LMR - Meals (max. per diem rate - $ 45/day) | worker | 270 | 0 |

Plan Total : $ 13,500

( EDIT )   ( SUBMIT )   ( EXIT )   ( PRINT VIEW )

INTERACTIVE ELECTRONIC BILL PAYMENT SYSTEM

This application a continuation of U.S. patent application Ser. No. 10/960,984, filed Oct. 12, 2004 now abandoned, which is a continuation of U.S. patent application Ser. No. 10/656,265, filed Sep. 8, 2003 now abandoned, which is a continuation-in-part of U.S. patent application Ser. No. 10/277,205, filed Oct. 22, 2002 now U.S. Pat. No. 8,108,274, which claims the benefit of U.S. Provisional Application No. 60/408,884, filed Sep. 9, 2002, all of the above applications are herein incorporated by reference.

BACKGROUND OF THE INVENTION

Field of the Invention

The present invention relates to electronic bill submission and processing, and in particular to insurance claims corresponding to providers of insurance services.

SUMMARY OF THE INVENTION

According to the present invention there is provided an electronic bill processing system for coordinating the submission and processing of an electronic bill corresponding to a provider of insurance services, the system comprising:
 a) a provider interface;
 b) an integrated database coupled to the provider interface for storing bill information pertaining to the electronic bill;
 c) a workflow engine coupled to the integrated database for coordinating the processing of the electronic bill and for updating the bill information in response to the bill processing; and
 d) a management system coupled to the integrated database for monitoring the contents of the integrated database accessible by the provider interface;
 wherein the provider can coordinate real-time retrieval of submission and status details for bill information contained in the integrated database.

According to a further aspect of the present invention there is provided a method for coordinating the submission and processing of a bill according to predictive payment data of a plan the method comprises the steps of:
 a) storing the predictive payment data corresponding to the plan in a database coupled to an adjudication engine;
 b) inserting a predictive payment parameter into a rule set of the adjudication engine for eventual adjudication of the predictive payment data at a predefined interval, the predictive payment parameter corresponding to a content of the plan;
 c) triggering a creation of the electronic bill at the predefined interval according to the predictive payment parameter;
 d) retrieving the predictive payment data from the database and providing the predictive payment data to the adjudication engine;
 e) updating the predictive payment parameter for recognising the submission of the payment data to the adjudication engine; and
 f) generating the bill as defined by the predictive payment data of the plan once adjudicated.

According to a still further aspect of the present invention there is provided a system for coordinating the submission and processing of a bill according to predictive payment data of a plan. The system comprises:
 a) a provider interface;
 b) an integrated database for receiving a predictive payment plan submitted from the provider interface;
 c) a predictive payment request of the plan storable in the database, the request including a plurality of predictive payment parameters;
 d) an adjudication engine coupled to the integrated database; and
 e) an insertion function for inserting the predictive payment parameters, when stored in the database, into an adjudication rule set of the adjudication engine, the adjudication rule set for eventual adjudication of the predictive payment data;
 wherein adjudication of the predictive payment data results in the generation of the bill.

BRIEF DESCRIPTION OF THE DRAWINGS

These and other features of the preferred embodiments of the invention will become more apparent in the following detailed description in which reference is made to the appended drawings wherein:

FIG. 5 is a further example screen of the interface of FIG. 3;

FIG. 10 shows a first graphical user interface for the workflow of FIG. 7;

FIG. 10 shows a second graphical user interface for the workflow of FIG. 7;

FIG. 12 shows a third graphical user interface for the workflow of FIG. 7;

FIG. 13 shows a fourth graphical user interface for the workflow of FIG. 7;

FIG. 14 shows a fifth graphical user interface for the workflow of FIG. 7;

FIG. 16 shows a first graphical user interface for the workflow of FIG. 9;

FIG. 19 shows a fourth graphical user interface for the workflow of FIG. 9;

FIG. 20 shows a fifth graphical user interface for the workflow of FIG. 9;

FIGS. 22, 23, and 24 show a plan versus actuals report according to the workflow of FIG. 21;

FIG. 26 shows an interface for a predictive payment; and

DESCRIPTION OF THE PREFERRED EMBODIMENTS

Figure 1:
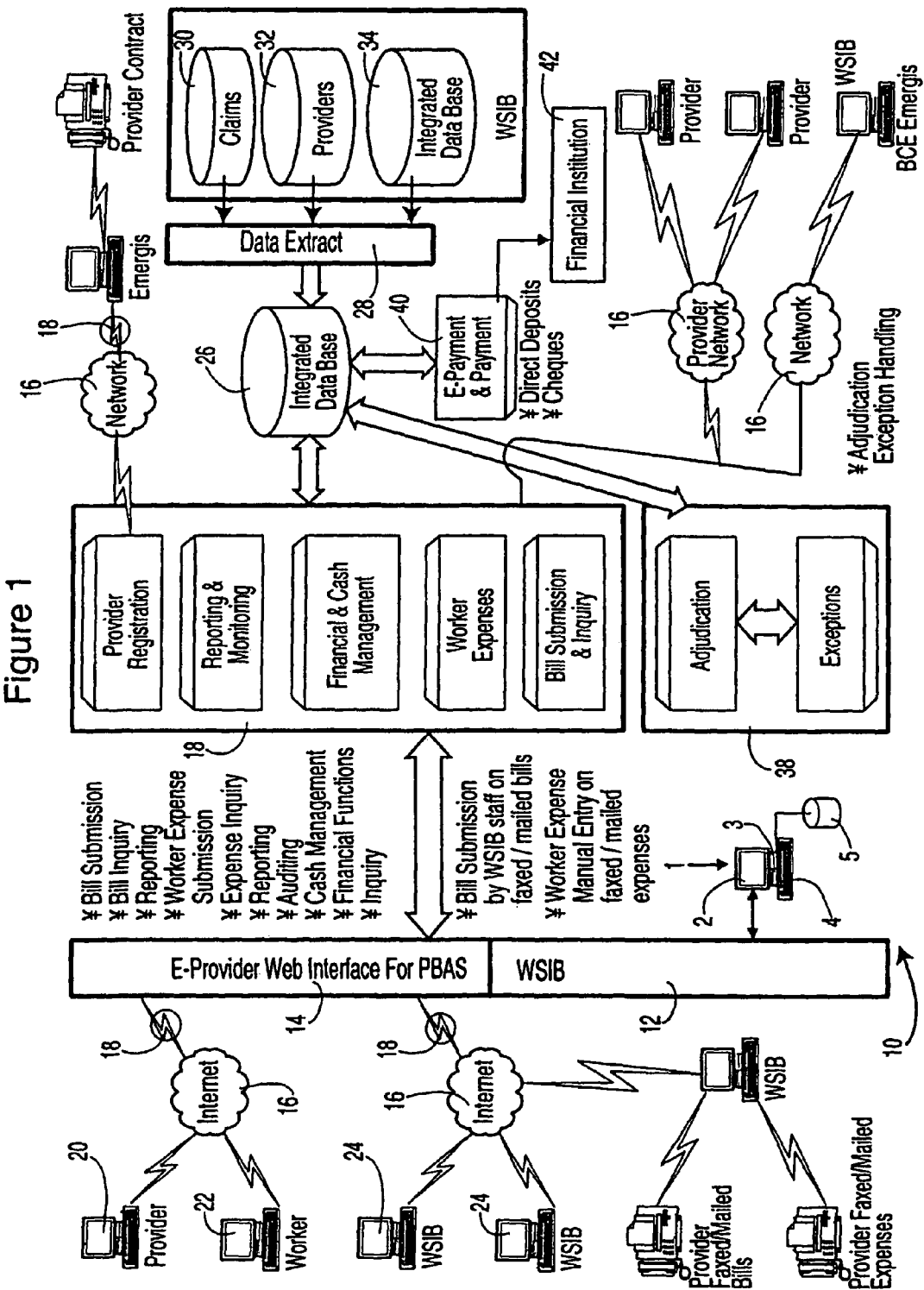
FIG. 1 is an electronic bill processing and management system.

Referring to FIG. 1, an insurance bill electronic processing and management system 10 has user interfaces 12, 14 for communicating over a network 16, such as the Internet, information 18 related to insurance bill submission and processing corresponding to insurance claims. The user interface 14, in the form of a web browser, facilitates electronic submission of the bill information 18 from service providers 20 to an integrated database 26. The integrated database 26 stores the bill information 18 for record keeping. The providers 20 provide insurance related services to workers 22 making the insurance claims. Management of the insurance services, provided by the providers 20, is overseen by a labour management agency 24. The agency 24 uses the user interface 12 to manage the type and content of the bill information 18 contained within the database 26, as well as coordinating overall processing and access of the bill information 18. It is recognised that the workers 22 could also submit electronic bills through the interface 14 with limited functionality.

The system 10 supplements the bill information 18 with general data parameters 28 obtained from an insurance claim database 30, a provider identification database 32, and an employers/workers database 34. The data parameters 28 are typically not specific to any one bill represented in the bill information 18, and include worker addresses, provider names and services, and insurance claim particulars. A workflow engine 36 (see FIG. 2) manages the transfer of the bill information 18 and the data parameters 28 between an adjudication engine 38 and a payment engine 40. The adjudication engine 38 processes any bills, related to the insurance claims, resident in the integrated database 26 to determine what portion of the bills, if any, should be paid out. The adjudication engine 38 therefore receives bills from the providers 20, adjudicates the provider bills according to business rules (including utilisation rules), generates adjudication results for valid "complete" bills, and generates exception records for invalid "exception" bills. The payment engine 40 then directs payment of the adjudicated complete bills to a financial institution 42 for subsequent payment to the providers 20 and/or workers 22.

Accordingly, the bill information 18 includes details related to bill status, such as pending or approved, related claim data, and bill payment particulars. The providers 20 have real-time access through the interface 14 to selected bill information 18 contained within the integrated database 26, corresponding to pre and post processing of the insurance claims and the related bills. The management agency 24 determines the degree of access by the providers 20 to the bill information 18 through the provider procedures 44 (see FIG. 2), which defines the functionality of the provider interface 14. Real-time accessibility of the bill information 18 resident on the integrated database 26 facilitates self-management, by the providers 20, of the bill processing history once the bills are submitted through the interface 14 to the integrated database 26. Therefore, the integrated database 26 acts as a repository of bill information 18 and payment information related thereto.

Referring to FIG. 1, the management agency 24 uses a support system 1 for monitoring and setting up the electronic processing and management system 10. The support system 1 includes a processor 2 coupled to the interface 12. The processor 2 is coupled to a display 3 for displaying the interface 12 and to user input devices 4, such as a keyboard, mouse, or other suitable devices. If the display 3 is touch sensitive, then the display 3 itself can be employed as the user input device 4. A computer readable storage medium 5 is coupled to the processor 2 for providing instructions to the processor 2 to instruct and/or configure the various components of the system 10, including the processes related to operation of the workflow engine 36 and interfaces 12,14. These instructions can be used to help set-up and define the protocols and other procedures related to the operation of the system 10. The computer readable medium 5 can include magnetic disks, magnetic tape, optically readable medium such as CD ROM's, and semi-conductor memory such as PCMCIA cards. In each case, the medium 5 may take the form of a portable item such as a small disk, floppy diskette, cassette, or it may take the form of a relatively large or immobile item such as hard disk drive, solid state memory card, or RAM provided in the support system 1. It should be noted that the above listed example mediums 5 can be used either alone or in combination.

Figure 2:
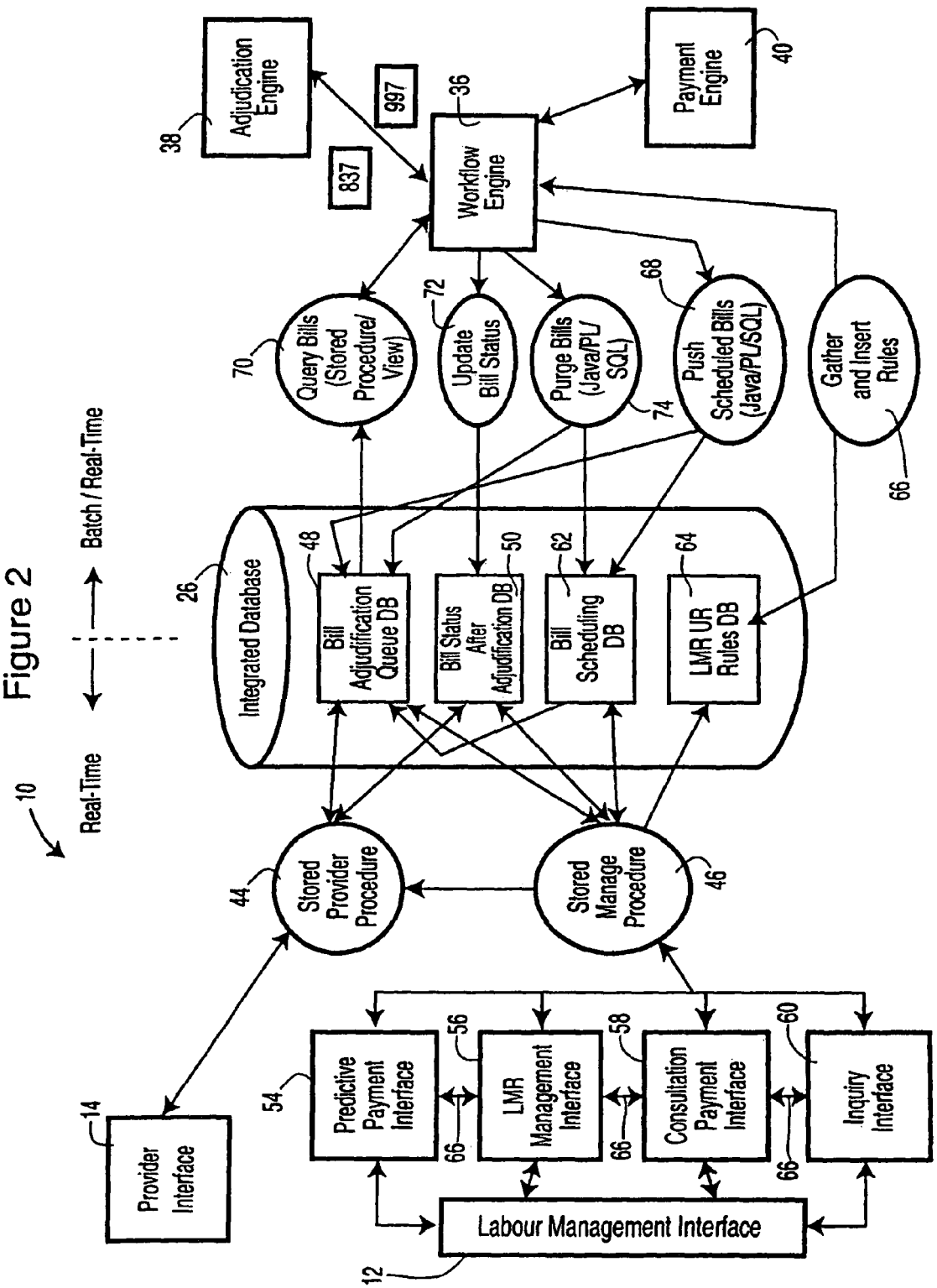
FIG. 2 is a component model of the system of FIG. 1.

Referring to FIG. 2, the functionality of the provider interface 14 is controlled by the provider procedures 44, which are predefined by the management procedures 46 according to the desired degree of accessibility to the bill information 18 resident on the integrated database 26. The procedures 44 permit the providers 20 through the interface 14 to select bills, update bills, delete bills, and determine bill status once submitted to the integrated database 26. Sub-databases of the integrated database 26, directly accessible by the providers 20 in real-time, are a bill adjudication queue database 48 and a bill status database 50. The queue database 48 lists bill information 18 including all bills (and corresponding bill details) awaiting adjudication, which preferably are both read and write accessible by the providers 20. The status database 50 lists bill information 18 including a pending status (bills undergoing adjudication), a result status (bill adjudication results), and/or a payment status (bill payment decision), which are preferably only read accessible by the providers 20. Real-time inquiry of these bill statuses and queue are accessible (defined by the provider procedures 44) by the providers 20 through the interface 14, with detailed breakdowns of the adjudication and payment decisions determined by the adjudication engine 38 and the payment engine 40.

Further referring to FIG. 2, the management user interface 12 allows the management agency 24 to make decisions on the operation of the system 10, as well as select, delete, update, and inquire on selected bills submitted by the providers 20 and/or workers 22. The interface 12 has a set of sub-interfaces of a predictive payment interface 54, labour market re-entry (LMR) interface 56, a consultation payment interface 58, and an inquiry interface 60, which are controlled by the management procedures 46 as defined by the management agency 24. The management agency 24 can also use the interfaces 54, 56, 58, 60 to update the provider procedures 44 and management procedures 46. The management agency 24 can use the predictive interface 54 and the LMR interface 56 to define and create individual adjudication rules (utilisation rules UR), related to specific codes (for example LMR codes), for insertion into the business rule set of the adjudication engine 38.

Referring again to FIG. 2, the management procedures 46 provide both read and write interaction of the interfaces 54, 56, 58, 60 with the integrated database 26. Interaction between the interfaces 54, 56, 58, 60 is indicated by arrows 66, which allows for the sharing of billing data and review functionality between the interfaces 54, 56, 58, 60, including prepopulation of data fields. The interfaces 54, 56, 58, 60 have access to the adjudication queue database 48 and the status database 50 as described above, with further capabilities such as editing the operation of the bill queue and amending the bill statuses. The interfaces 54, 56, 58, 60 also have access to sub-databases of a bill scheduling database 62 and an adjudication rules database 64. The scheduling database 62 contains data pertaining to bills removed from the queue database 48 by the workflow engine 36 for future processing, and/or data pertaining to predictive bills that are periodically inserted into the queue database 48 by the workflow engine 36 for processing by the adjudication engine 38 and payment engine 40. The adjudication rule database 64 contains adjudication rules created by the interfaces 54 and 56 in response to periodic bill parameters for predictive and labour market re-entry (LMR) insurance claims as controlled by the workflow engine 36. It is recognised that data for bills related to LMR insurance claims could also be stored in the scheduling database 62. The degree of access for the read and write interaction of the database 48, 50, 62, 64 contents could also be limited to various access levels for individuals of the management agency 24, depending upon the individuals' priority. The access to the integrated database 26 from the interfaces 12, 14 can be determined by role based features for individual providers 20 and employees of the management agency 24, as well as state based features used as lock out features to permit sequential rather than parallel editing of the bill information 18 and data parameters 28.

Referring again to FIG. 2, the workflow engine 36 monitors the data content of the sub-databases 48, 50, 62, 64 according to the management procedures 46, as well as amendment of the rule set of the adjudication engine 38 by the contents of the rules database 64. The data content of the databases 48, 50, 62, 64 consists of the bill information 18 and the data parameters 28, which are supplied by the management agency 24, the providers 20, and the workers 22. Adjudication and payment details, generated by the adjudication engine 38 and payment engine 40 respectively, are also coordinated by the workflow engine 36 into and out of the integrated database 26, as required. It is recognised that access of the interfaces 12, 14 to the contents of the integrated database 26 is preferably in real-time. Further, access to the integrated database 26 by the workflow engine 36 is preferably in periodic or batch mode to facilitate processing efficiencies, such as providing lump sum payments to particular providers 20 related to a plurality of adjudicated bills. However, real-time access of the workflow engine 36 to the integrated database 26, for adjudication and payment results, could also be done if desired.

Referring to FIG. 2, the workflow engine 36 coordinates, through a defined gather/insert process 66 by the management procedures 46, the gathering of all adjudication rules from the rule database 64 for insertion into the adjudication engine 38. The workflow engine 36 also coordinates a scheduling process 68 for creating bills from the scheduling database 62 contents, which are scheduled for insertion into the queue database 48 and the processed by the adjudication engine 38 and/or payment engine 40 at specified periodic intervals. The process 68 queries a scheduled bill table of the database 62 to confirm which bills should be processed on a periodic cycle, such as a daily cycle, and build any confirmed bills using minimum bill data requirements for the bill queue of the queue database 48. Accordingly, the process 68 extracts scheduling data from the database 62, and then decides whether to hold the bills pertaining to the scheduling data for future action or to populate the bill queue of the queue database 48 with the extracted scheduling data. This population of the queue table permits adjudication of the associated bills in sequence through a query process 70 as described below.

The workflow engine 36 coordinates the query process 70, which queries all bills in the database 48 ready for adjudication, both direct and predictive based. For example, the process 70 will create an 837 flat file containing all bills obtained from the database 48, and then transfer the 837 file to the adjudication engine 36 for processing. The adjudication engine 36 creates an adjudication results file, such as an acknowledgement 997 flat file, which is then reviewed by an update process 72 to determine the degree of success/failure of each bill adjudication. The update process 72 also transfers the success/failure details of the 997 file to the status database 50, for subsequent review through the interfaces 12, 14. Further, the update process 72 would also insert payment details from the payment engine 40, related to the success/failure details of the 997 file. The workflow engine 36 also coordinates a purge process 74 to purge bills from the queue database 48 and the scheduling database 62 if needed. For example, the process 74 will purge all successfully processed bills from the queue database 48 and all bill schedules from the schedule database 62 that have passed their end date. It should be noted that the bill tables of the queue database 48 and the scheduling database 62, along with the query process 70 and the schedule process 68 provides an extraction and processing loop for bills of a predictive nature as entered into the integrated database 26 through the predictive interface and/or the LMR interface 56.

Figure 3:
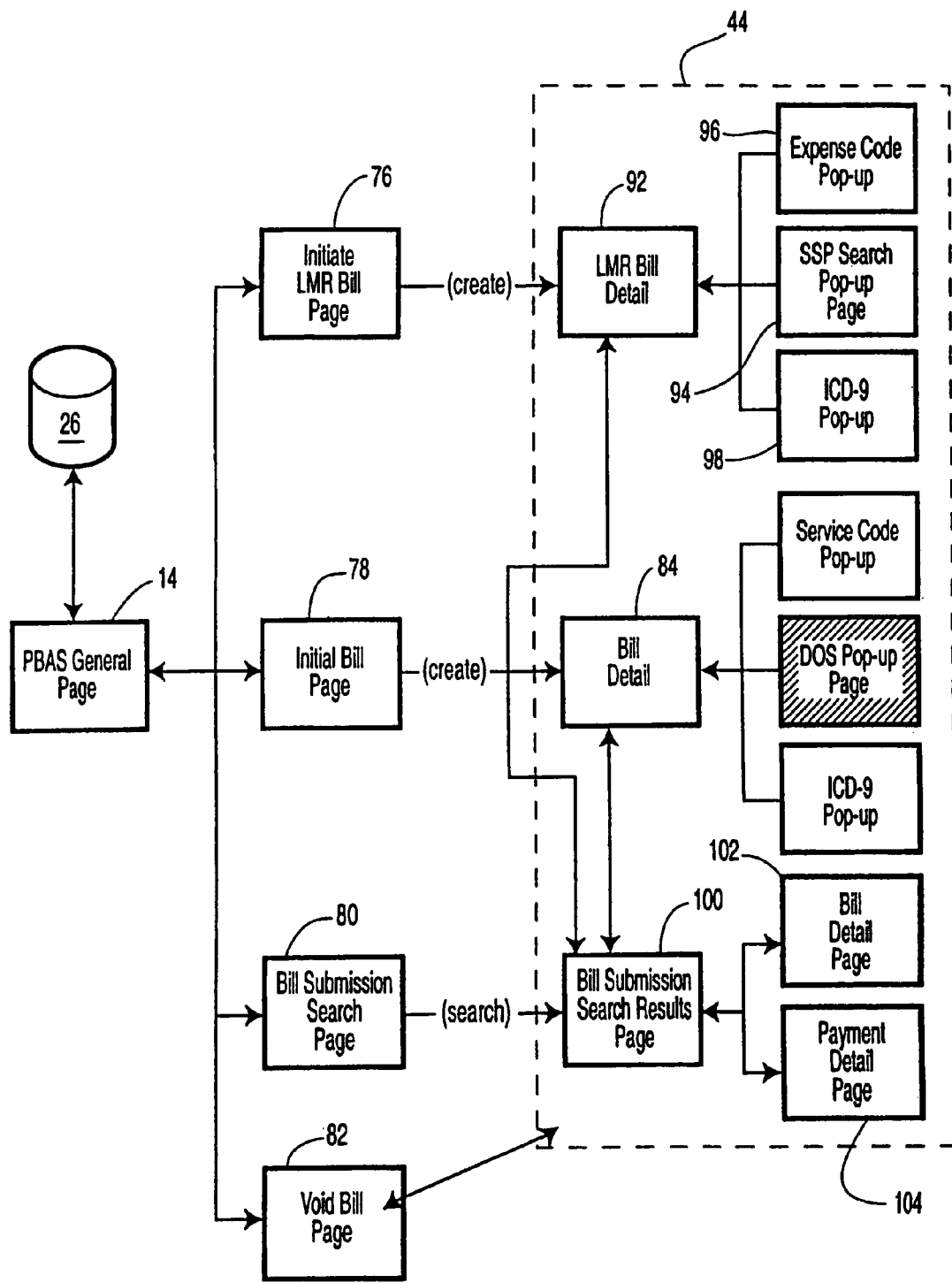
FIG. 3 is a component model for a provider bill submission interface for the system of FIG. 1.

Referring to FIG. 3, the service provider interface 14 has four sub-interfaces, namely an initiate LMR bill interface 76, an initiate bill interface 78, a bill submission search interface 80, and a void bill interface 82. The interfaces 76, 78, 80, 82 allow the providers 20 (see FIG. 2) to directly manage electronically their bill submission and results relating to insurance claims of the workers 22. The interface 76 allows the providers 20 to submit bills for payment processing using an electronic version of an LMR provider invoice, such as an electronic version that conforms to an EDI claim import (ASCX12N 837) format. The interface 78 allows the providers 20 to submit bills for payment processing using the electronic version of a provider payment request, such as for example the electronic version conforming to the claim import (ASCX12N 837) format. The interface 80 allows the providers 20 to execute enquiries on their bill submissions and draft bills resident on the integrated database 26. These enquiries can include bill detail, bill history, as well as the status of bill payment submissions. Preferably for processing efficiency, real time confirmation of submissions and payment status information may not be supported, and payment detail may only be available as per a check run schedule implemented by the payment engine 40. The interface 82 allows the providers 20 to manage their bill submissions through void bill actions. For example, in the case of batch mode operation of the adjudication engine 38 and/or the payment engine 40, the interface 82 will support same day avoidance submissions only. Capability could also be included in the system 10 to cancel previously submitted bills once they have been removed from the bill queue in the queue database 48 for adjudication by the adjudication engine 38. Accordingly, the interfaces 76, 78, 80, 82 allow the providers 20 to capture bill detail, save draft bills, export bill detail to the adjudication engine 38, void bill submissions, and query bill detail and payment status.

Referring to FIG. 3, the interface 78 has functionality defined by the provider procedures 44. In particular, the interface 78 has a bill details function 84 of the procedure 44, which allows the providers 20 to initiate payment requests that are subject to invalid data, create payment requests and save submissions, create payment requests and exit submissions, create and submit payment requests subject to an incompletion, and successfully create and submit payment requests. It is understood that the bills are submitted in response to the providers 20 performing or otherwise providing service, treatment, or products to the workers 22. It is understood that the workers 22 claims are established with the management agency 24 prior to submitting the bills, and the worker/claim entitlement information has been previously loaded into the adjudication engine 38 and the integrated database 26. The result of the details function 84 is either a payment request saved as a draft for future submission or a payment request that is submitted for processing through the interface 14 to the integrated database 26. Further, the providers 20 can use a combination of claim/worker data to submit the bill requests. It is recognised that the details function 84, and other functions as described below, could be represented as software modules for use by the support system 1.

Figure 4:
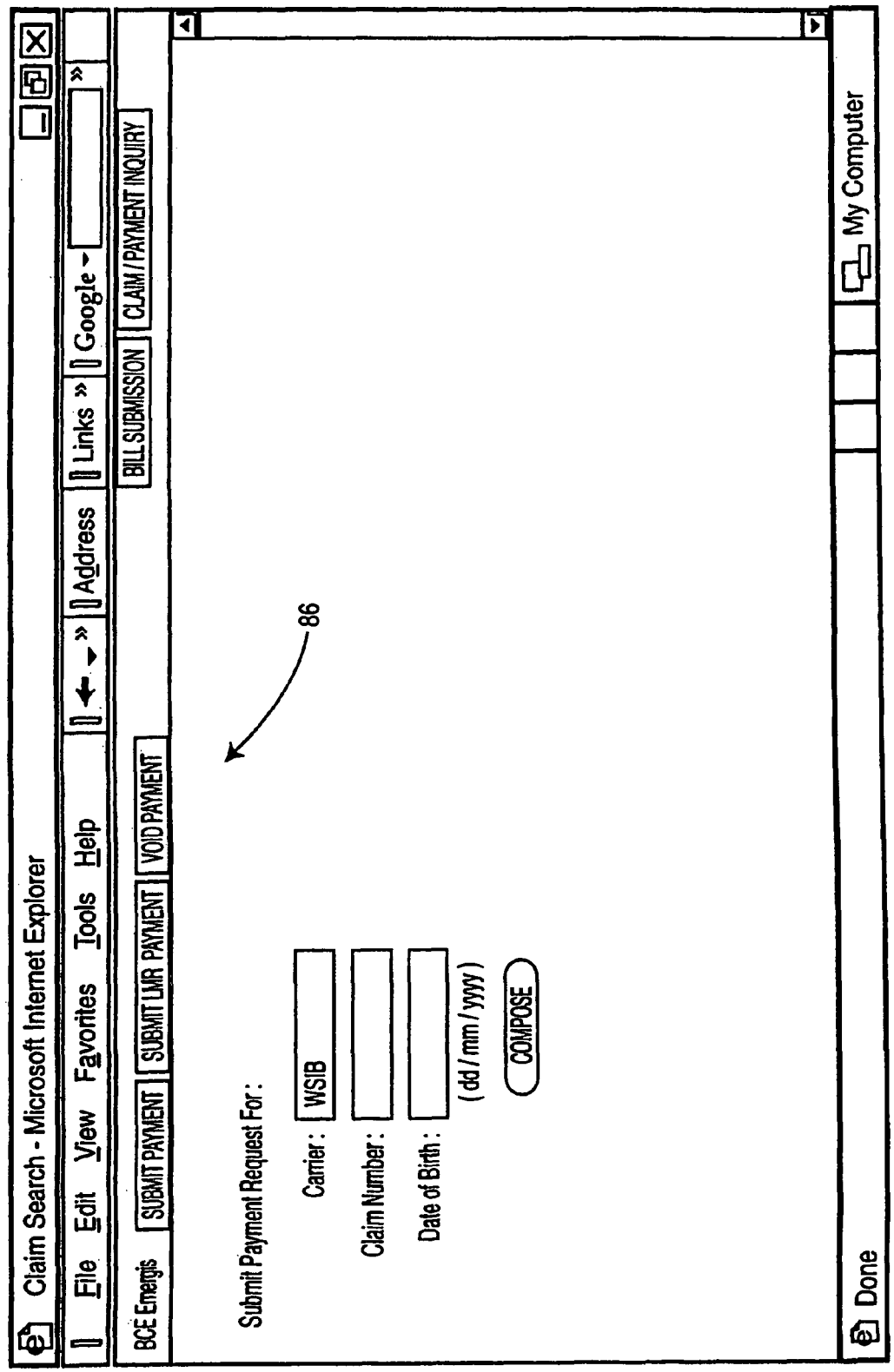
FIG. 4 is an example screen of the submission interface of FIG. 3.

A first operation of the function 84 is to indicate that a combination of claims/worker data 89, 91 in the payment request inputted by the provider 20 is invalid. Referring to FIGS. 4 and 5, the function 84 provides a submit bill menu 86 to the provider 20, whereby the provider 20 enters a claim number in conjunction with worker/patient 22 profile data 91 (see FIG. 5), such as date of accident, surname, given name, and date of birth, when completed for submission to initiate the payment request. Other claim data 88 includes service codes, modifiers, ICD-9 codes, date of service, place of service, units, and dollar amounts. In this instance, the profile or claim data 88 is determined to be invalid by the provider procedures 44 and the provider 20 is notified the claim/patient information is invalid. Accordingly, the error could be the result of the combination of data 88, 89, 91 being invalid (e.g. wrong claim/worker combination), the claim number (record) not existing in the integrated database 26 (i.e. the claim has not yet been approved/fed into the appropriate components of the system 10), and/or a typographical error on the part of the provider 20 when keying in the requisite validation information included in the data 88, 89, 91. Accordingly, the invalidation process of the provider procedures 44 provides a validation mechanism in order for the provider 20 to proceed with the payment request submission. The provider 20 is given choices to continue with the request session on the interface 14.

Another operation of the function 84 is to create the payment request and then save the submission in draft for future editing/submission. Initially, the provider 20 navigates on the interface 14 to the bill submission component of the menu 86 and selects the submit payment request submenu option. The provider 20 then enters the data 88, 89, 91 and submits to initiate the payment request. The provider 20 then confirms patient 22/provider 20 profile information 87, 91 and defines the bill line item information 88, such as date of service, service code and charge. The provider 20 then saves the payment request without submitting the bill to the integrated database 26. For example, a warning message could be displayed on the interface 78 advising the provider 20 that the payment request is being saved without submitting the bill to the integrated database 26. Accordingly, the provider 20 can then retrieve and submit the bill related to the saved payment request at a later date, or can delete the draft bill via the void bill interface 82 as further explained below. It should be noted, referring to FIG. 5, that the providers 20 have the ability to input a provider specific invoice as a payment request to the integrated database 26. The data 88 can contain multiple bill line items on a per claim basis, which indicates the specific dates of service for each line and applicable modifiers (for equipment) of the requests. The provider is given further choices to proceed with the request session on the interface 14.

A further operation of the bill detail function 84 is for the provider 20 to create and exit without saving or submitting the payment request. Accordingly, the provider 20 navigates on the interface 14 to the bill submission component of the menu 86 and selects the submit payment request submenu option. The provider then enters a claim number in conjunction with patient profile data 91 and submits to initiate the payment requests. The provider 20 also confirms the patient 22/provider 20 profile information 87, 91 and defines the bill line item information 88, however, then proceeds to exit the request without saving or submitting the bill. Accordingly, the function 84 displays a warning message advising the provider 20 that the request is being exited without saving or submitted. The provider is given further choices to proceed with the request session on the interface 14.

A further operation of the function 84 is to initiate interaction with the provider 20 when creating the payment request, where some of the required data 87, 88, 89, 91 is incomplete. Accordingly, the provider 20 selects the submit payment request from the menu 86 provided by the interface 14, enters the claim number in conjunction with the patient profile data 91 and submits to initiate the payment request. The provider also confirms the patient 22/provider 20 profile information 87, 91 and defines the bill line item information 88. The provider 20 then proceeds to submit the payment request, however, a warning prompt appears informing the provider 20 that the required information is incomplete and that the payment request will not be dispatched for the current claim. The provider is given further choices to proceed with the request session on the interface 14.

Another operation of the function 84 is for a provider 20 to create and submit a complete payment request. Once the provider 20 has entered the claim number in conjunction with the patient profile data 91, and confirmed the patient 22/provider 20 profile information 87, 91 and bill line item information 88, the provider procedures 44 check that all of the required information is correct and then provides the provider 20 with a confirmation prompt informing that the bill will be dispatched to the integrated database 26 for payment processing. Accordingly, the provider 20 can select OK and the bill will be submitted for processing, can select CANCEL and then edit or otherwise discard the payment request, or if the payment request has been submitted the provider 20 can retrieve from the integrated database 26 the particular payment request and void the related bill. It is also recognised that a popup search box for the selection of primary service provides (POS), representing a list of providers 20 enrolled for use of the system 10, is accessible by the function 84 for completing the payment request.

Referring to FIG. 3, Labour Market Re-entry (LMR) bill interface 76 of the general provider interface 14 enables LMR providers 20 to submit LMR invoices to the management agency 24 for payment via electronic submission provided by the system 10. The LMR bills are for service, treatment, or products provided/performed by the provider 20 according to an approved LMR plan as accommodated for in the integrated database 26 and the adjudication engine 38. The approved LMR plan includes a budget amount relating to the types of service, treatment, and/or product provided or performed by the provider 20. Each of the types is referred to as a line of service. It is recognised that the utilisation rules (UR) of the rules database 64 have been loaded by the work flow engine 36 into the adjudication engine 38 prior to submission of the LMR invoice. The provider procedures 44 contain an LNR bill detail function 92 for co-ordinating the creation and submission of LMR invoices (payment requests). It is noted that the LMR providers 20 can identify the combination of claim/patient profile information 89, 91 to proceed with a payment request submission through the validation mechanism, as described above in relation to the function 84. Further, the LMR providers 20 can submit multiple lines of service as bill line items 88 on a per claim basis and can identify an SSP for each of the lines of service. Further, the LMR providers 20 also indicate specific dates of service for each line of service included in the data 88 as well as indicating applicable modifiers (for equipment) in the LMR invoices. In addition to that described above for the function 84, the function 92 also allows the LMR provider 20 to identify the secondary service provider (SSP) for which the bill line items 88 apply. Preferably, only one SSP is identified per bill and all line items 88 are associated accordingly. Further, the function 92 also operates with a search popup page 94, which is supplied to the provider 20 through the interface 76. The popup page 94 allows the provider 20 to search and select appropriate SSPs. In addition, further popup pages of an expense code 96 and an ICD-9 98 can be provided by the function 92 to the interface 76 to allow the provider 20 to clarify and confirm portions of the data 88 corresponding to expenses and ICD-9 information. Accordingly, similar to the function 84, the function 92 also allows the provider to select OK for submitting the LMR invoice for processing, selecting CANCEL and/or EDIT discard features for the LMR invoice, and if the invoice has been previously submitted the provider 20 can retrieve and void the invoice. Further, more than one SSP can be selected through the popup page 94 to be included in the LMR invoice.

Referring to FIG. 3, the sub-interface 82 of the general provider interface 14 enables the providers 20, both payment requests and LMR invoices, to cancel bill submissions and/or draft bills. It should be noted, for batch mode operation of work flow engine 36 the voiding of bills may only be available for same day cancellations, or any other period specified for the batch mode. It is assumed that prior to accessing the VOID bill page interface 82, the provider 20 has already submitted the bill payment request, saved as a draft the bill payment request, and/or has decided to proceed with a same day (or other period) review/cancellation process. Accordingly, the provider procedures 44 allow the provider 20 to navigate to the VOID bill submission interface 82, whereby the provider 20 selects the draft or submitted bill to be cancelled via a check box (for example, "Void bill?") and the submit a VOID request (for example by a "Void selected" button). See scenarios below discussed users guide and example screens for the interfaces 14, 76, 78, 80, 82. It should be noted that multiple bills can be voided simultaneously through the VOID interface 82. Once the VOID request has been received by the integrated database 26, a confirmation message is displayed on the interface 82 to the provider 20 thereby informing the provider 20 that the selected bills will be cancelled. The provider 20 is given the option to select OK for the bills to be cancelled or to select cancel so that the VOID selections will be cleared and therefore not voided from the integrated database 26, through operation of the process 74 implemented by the work engine 36.

Referring to FIG. 3, the bill submission search interface 80 of the general provider interface 14 enables the providers 20, for both payment requests and LMR invoices, to investigate the adjudication and payment status of bills submitted to the integrated database 26. For batch mode operation of the work flow engine 36, real-time confirmation of submissions and payment status information may not be supported. Moreover, payment detail may only be available as per a check run schedule as implemented by the payment engine 40. The interface 80 has a bill submission search results function 100 as part of the provider procedures 44. The function 100 allows the provider 20 to retrieve bills/payment details from the databases 48, 50 of the integrated database 26 by a variety of search parameters, such as claim-invalid, claim number-valid, date range-invalid, data range-valid, status-invalid, status-valid, claim number and date range, and status and claim number. It is further recognised that other combinations of search parameters, including or excepting those above, can also be used for treating the bill/payment details from the integrated database 26. It is noted that SDT inquiry functionality and design can be leveraged for the provider 20 inquiry implemented by the interface 80. The search function 100 co-ordinates the display of either a bill details page 102 or a payment details page 104 on the search interface 80.

Operation of the function 100 is initiated when the provider 20 navigates to the bill payment inquiry component of the menu 86 of the general interface 14 (see FIG. 4). The provider 20 enters a claim number to filter the claims by and then submits. However, in one case the claim number entered may be invalid, and therefore an error message is displayed on the interface 80 by the search function 100 informing the provider 20 that no bill exists for that claim. The provider 20 can then select different claim numbers or parameters and then re-submit. Accordingly, the provider 20 can investigate adjudication results and payment details for submitted bills. An alternative to the above operation is when the provider 20 enters the claim number to filter the claims by, which contains a valid claim number, and therefore a list of bills is provided by the function 100 for the appropriate claim number for display on the interface 80. The interface 80 can display the inquiry results as the bill detail page 102, the payment detail page 104, or a combination of both. Further, upon the inquiry for a valid claim number, the provider 20 can narrow the search by the finding/modifying additional criteria. As well, the provider 20 can select a particular bill (such as a link pertaining to a particular bill ID) to be viewed in greater detail. Accordingly, the function 100 interacts with the bill detail function 84 or the LMR bill detail function 92 to retrieve the requested bill detail. Alternatively, the provider 20 can select a paid amount (such as a link for a particular payment) to be viewed in detail. The function 100 can then interact with the bill detail function 84 or the LMR bill detail function 92 to retrieve required details for display on the bill detail page 102 or the payment detail page 104 on the interface 80.

A further operation of the search function 100 allows the provider 20 to retrieve bills/payment detail information by date range. The provider 20 enters a start/end date range or uses a calendar control to select a date to refine the search results by, and submits through the interface 80. The search function 100 then checks the date range against the bill details stored in the databases 48, 50, and for example can return with an invalid date range entered by displaying an error message on the interface 80 informing the provider 20 that no bills exist in the integrated database 26 for the date range selected. The provider 20 can then select a different date range or parameter and re-submit on the interface 80 through the search function 100. An alternative to the above is when the date range entered by the provider 20 is considered valid by the search function 100. In this case, a list of bills previously submitted by the provider 20 for the date range parameters selected is displayed on the interface 80. Accordingly, the provider 20 can narrow the search by defining/modifying additional criteria and can select either a particular bill and/or a particular paid amount to be viewed in greater detail. It should be recognised that multiple bill/payment details can be accessed through the general interface 14 simultaneously, as long as they correspond to the selected search criteria submitted through the interface 80 to the search function 100.

A further operation of the search function 100 is retrieving bill/payment detail information by status. The provider 20 selects the status range to filter submitted/draft bills by and then submits this to the search function 100. The search function 100 then proceeds to review the contents of the databases 48, 50. If the status selected is invalid, then an error message is displayed on the interface 80 informing the provider 20 that no bills exist for the status selected. The provider 20 can then select a different status or other parameter and re-submit the new search criteria to the search function 100. An alternative to the above is when the status criteria are considered valid by the search function 100. In this case, the status selected produces a list of bills matching the selected status, subsequently displayed on the search interface 80. As note above, the provider 20 can then narrow the search by defining/modifying addition search criteria and/or can select particular bills and/or paid amounts to be viewed in greater detail.

A further operation of the search function 100 is to retrieve bill/payment detail information from the databases 48, 50 by claim number and date range. Accordingly, the provider 20 enters a start/end date range to refine the search results and then enters a claim number to filter the claims by and then submits the search request to the search function 100. The search function 100 then searches through the databases 48, 50, and if valid, provides a list of bills previously submitted by the provider 20 for a given claim during the date range parameters specified for display on the interface 80. As noted above, the provider 20 can narrow the search further by defining/modifying additional criteria. Another operation is that the provider 20 can retrieve bills/payment detail information by specifying status and date range. Accordingly, the provider 20 enters into the interface 80 a start/end date range to refine the search results, then selects a status range to filter submitted/draft bills by, and then submits the search request to the search function 100. The search function 100 retrieves the matching bills, if valid, from the databases 48, 50 with a selected status during the date range parameters for display on the interface 80. The provider 20 can then narrow the search by defining/modifying additional criteria as noted above. A further operation of the search function 100 is to retrieve bill/payment detail information by status and claim number. The provider 20 enters a claim number to filter claims by and submits and selects a status range to filter submitted/draft bills by and submits. For a valid combination the claim number/status criteria is searched by the search function 100 in the databases 48, 50 to provide a list of bills usually submitted by the provider for a given claim during the given status for display on the interface 80. As noted above, the provider 20 can narrow the search by defining/modifying additional criteria.

A further operation of the search function 100 is to retrieve a saved payment request, modify the bill detail, and the submit to the integrated database 26 for payment processing through the work flow engine 36. This operation can be done by the provider 20 when bills have been created and saved for future processing. Accordingly, the provider 20 navigates to the bill/payment enquiry component of the menu 86 and then proceeds to enter a combination of search parameters to retrieve a list of bills (both active and pending). The parameters can include claim number, bill status, data range, and provider information. The provider 20 can then select from the list displayed on the interface 80 a particular bill with a status of pending. The details of the pending bill are displayed on the interface 80 and the provider 20 can make any necessary changes/additions of the draft bill. The provider 20 is then given the opportunity to submit the payment request, if the bill request is now complete, and then a confirmation prompt can appear on the interface 80 informing the provider 20 that the bill will be dispatched to the management agency 24 for payment processing. The provider 20 can select OK and the bill will be submitted to the integrated database 26 for processing, can select CANCEL and thereby edits/discard the bill, or if the bill has been submitted previously the provider 20 can retrieve and void the bill using the void interface 82.

The following outlines example interface 14, 76, 80, and 82 screens for a first scenario of submitting the payment request, a second scenario of submitting an LMR invoice, a third scenario of bill payment status enquiry, and a fourth scenario of voiding a bill. Further to that already described above, the scenarios 1, 2, 3, and 4 demonstrate the ability to provide multiple bill line items per claim for display on the appropriate interface 14, 76, 78, 80, 82, and the interaction of popup boxes for service code searches, date of service selections, LMR expense codes, and provider searches. Further, the enquiry and void scenarios allow the retrieval and subsequent selection of multiple bills per page, as displayed on the appropriate interface 80, 82, to facilitate easy of selection by the provider 20.

Further, an application user guide is provided for the LMR submission interface 76, the bill submission search interface 80 and void interface 82, appropriate either to LMR and/or bill payment requests. It should be noted, that the user guide explains further functionality of the system 10 such as printing a screen with bill information 18 contained thereon, and system 10 login for providers 20 part of a provider database having access to the system 10. It should be noted that registry opportunities for an unregistered provider 20 is also presented on the general provider interface 14. It should be noted that the user guide should be considered as one example of system 10 application to a specific management agency 24. Accordingly, some of the required criteria for entry into the data fields as displayed on the interfaces 14, 76, 80 may be other than those shown.

Also provided in this disclosure is an example implementation of the system 10 for provider bill submission UI web specification and error/warning messages. The web specification gives examples of the controls listed in the tab sequence of the menu 86 and sub-menus thereto, as well as the actions or events required on the various pages displayed on the interfaces 14, 76, 78, 80, 82 to initiate the corresponding listed responses. Further, the web specification also includes example data elements and data validation parameters.

Figure 6:
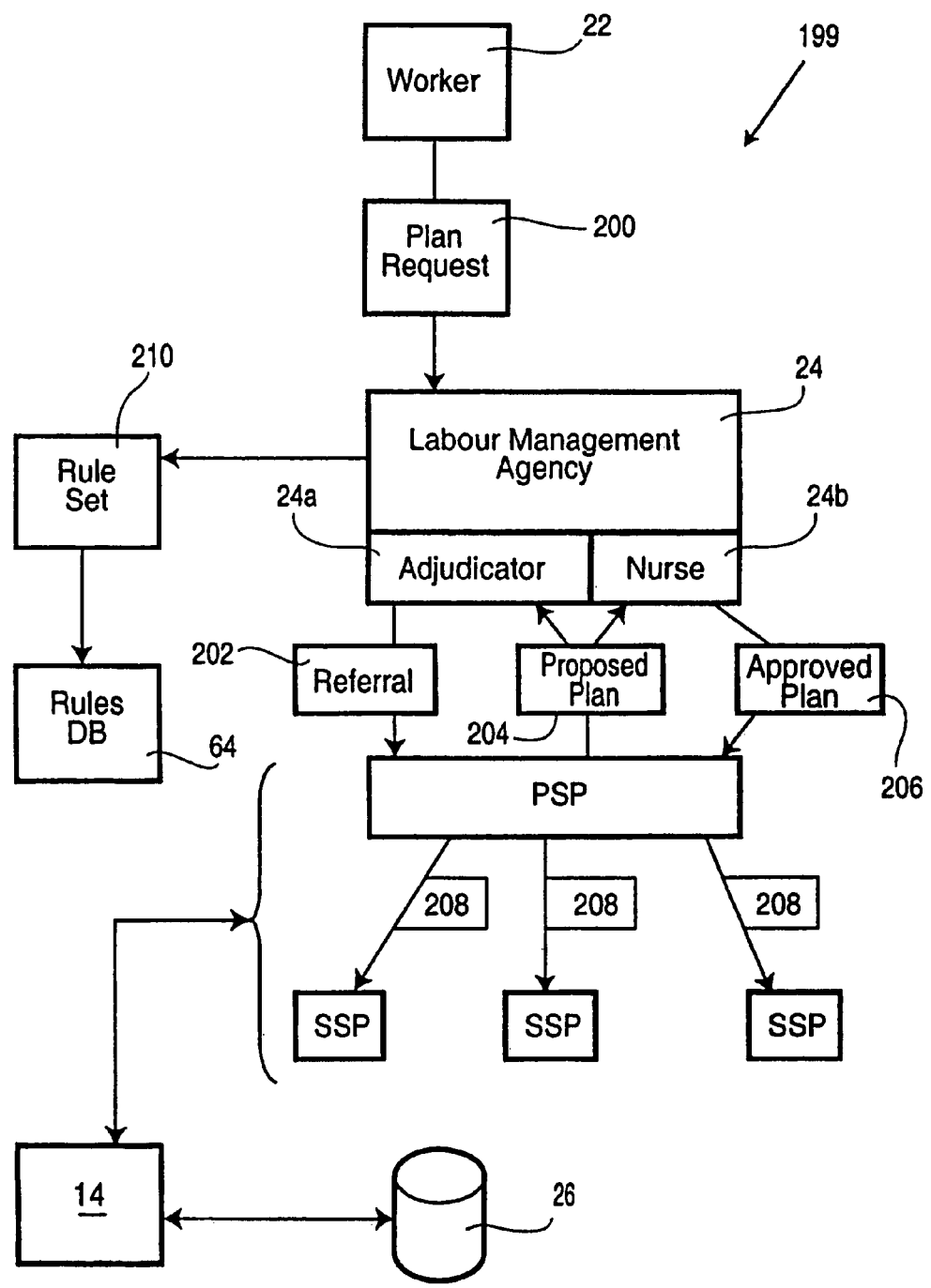
FIG. 6 shows a Labour Management Re-entry workflow of the system of FIG. 1.

Referring to FIG. 6, the LMR workflow 199 is shown between the worker 22, the management agency 24, and primary (PSP) and secondary (SSP) service providers. Initially, the worker 22 submits a plan request 200 to the management agency 24. The management agency then uses an adjudicator 24a to compose a plan referral 202, which is sent to a selected provider PSP. The PSP accepts the referral 202 and submits a completed or proposed plan 204 back to the management agency 24. The completed or proposed plan 204 includes a listing of expenses with corresponding SSPs, dollar amounts, start dates, and end dates. The adjudicator 24a in conjunction with a health care professional 24b reviews the plan and submits the approved plan 206 back to the PSP. The PSP can then sub-contract out portions 208 of the plan 206 to a number of SSPs. It is noted that there may be situations in which the plan 204 requires amendment and the referral 202 may be declined, as further described below. Further, once the approved plan 206 is confirmed, a rule set 210 is sent by the management agency 24 into the rules database 64 (see FIG. 2), which eventually is inserted into the adjudication rule set of the adjudication engine 38. The rule set 210 is used to identify whether bills are payable under the approved plan 206 by testing the bills against the rules. The rules include that the SSP on the bill is the same as the SSP on the line of service, that the date of service of the bill in within the range for the corresponding entry in the plan, and that the amount of the bill is less than the amount remaining in the plan budget for the corresponding line of service.

The PSP and SSP have access through the interface 14 (see FIG. 2) to the integrated database 26, for subsequent inquiry of the approved plan 206 as it is processed through the system 10. It should be noted that the approved plan 206 enables the management agency 24 to pre-approve a group of bills associated with the particular LMR plan 206. It should also be noted that it is preferable that only the intended provider PSP have access to the referral 202 through the interface 14.

Referring again to FIG. 6, the LMR workflow 199 is designed to assist the workers 22 who have injuries that prevent a return to work with the accident employer. The management agency 24 partners with the providers PSP, SFP to deliver skills acquisition and training programs. The management agency participates in the workflow 199 by initiating referrals 202, approving plans 206, monitoring programs, and helping to pay bills associated with the approved plans 206 through payors (not shown) who provide payment as specified by the payment engine 40 (see FIG. 2). Accordingly, the referrals 202 mark the starting point for the LMR workflow 199, as the worker 22 receives LMR services preferably through the referral 202 from the management agency 24 to the provider PSP. The provider PSP submits the proposed plan 204 to the adjudicator 24a who then indicates approval or requests changes. Once the plan is approved, the approved plan 206 provides the details needed to adjudicate LMR bills.

Once the plan 204 has been approved, bills can be submitted by the providers PSP, SSP to the IDB 26 (see FIG. 1) and paid according to the details in the plan 206, as further described below. The providers PSP, SSP incur costs in performing the LMR plan 206 for the worker 22. The providers PSP, SSP can then submit their bills through the interface 14 to the IDB 26 for their own expenses and for expenses incurred on behalf of the worker 22. The LMR bills are adjudicated by the adjudication engine 38 (see FIG. 2) and payment is determined by the payment engine 40 according to the rules established 210 previously upon plan approval. LMR bills that fall within entries in the plan and match plan requirements are approved by the adjudication engine 38 for payment. The rules 210 verify that the bills fall within the date requirements and budget requirements of the plan. Other bills are sent to a person for a manual check of the bill's eligibility for payment.

Figure 7:
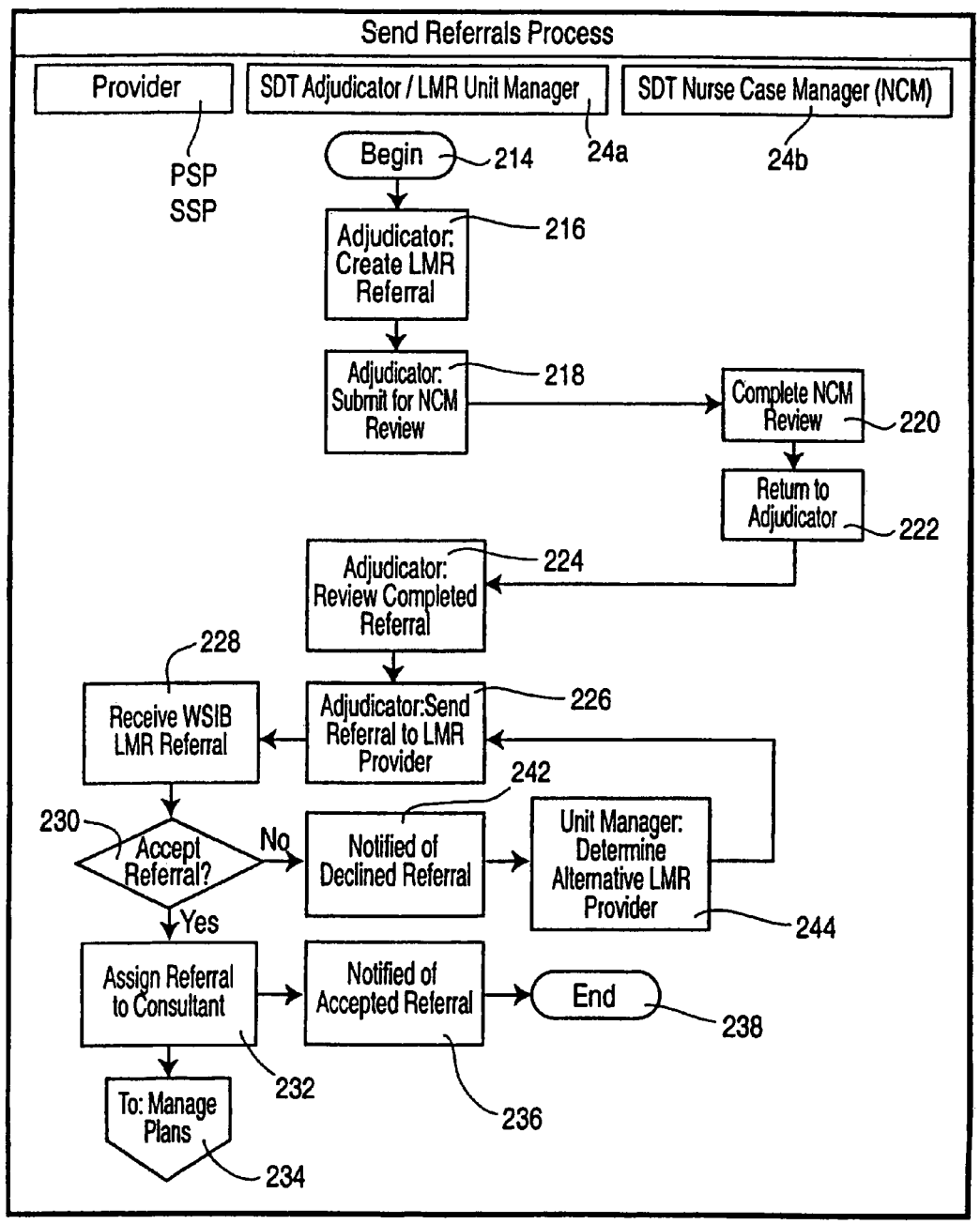
FIG. 7 is a referrals workflow for the re-entry workflow of FIG. 6.

Referring to FIG. 7, a send referrals process 212 starts 214 where the adjudicator 24a creates 216 the LMR referral 202 (see FIG. 6). The adjudicator 24a submits 218 the referral 202 for review by the nurse case manager 24b, who completes 220 the review and returns 222 the referral 202 to the adjudicator 24a. The adjudicator 24a receives 224 the referral 202 and sends 226 the referral 202 to the provider PSP, who can retrieve 228 the referral from the interface 14 (see FIG. 1) of the system 10. If the provider PSP accepts 230 the referral 202, then the referral 202 is assigned 232 to a consultant of the provider PSP to generate 234 the proposed plan 204. Further, the adjudicator 24a is notified 236 that the referral 202 has been accepted and the referral process 212 ends 238. Otherwise, the provider PSP declines 242 the referral and an alternate provider PSP is selected 244. This selection 244 continues until acceptance 236 is confirmed.

Figure 8:
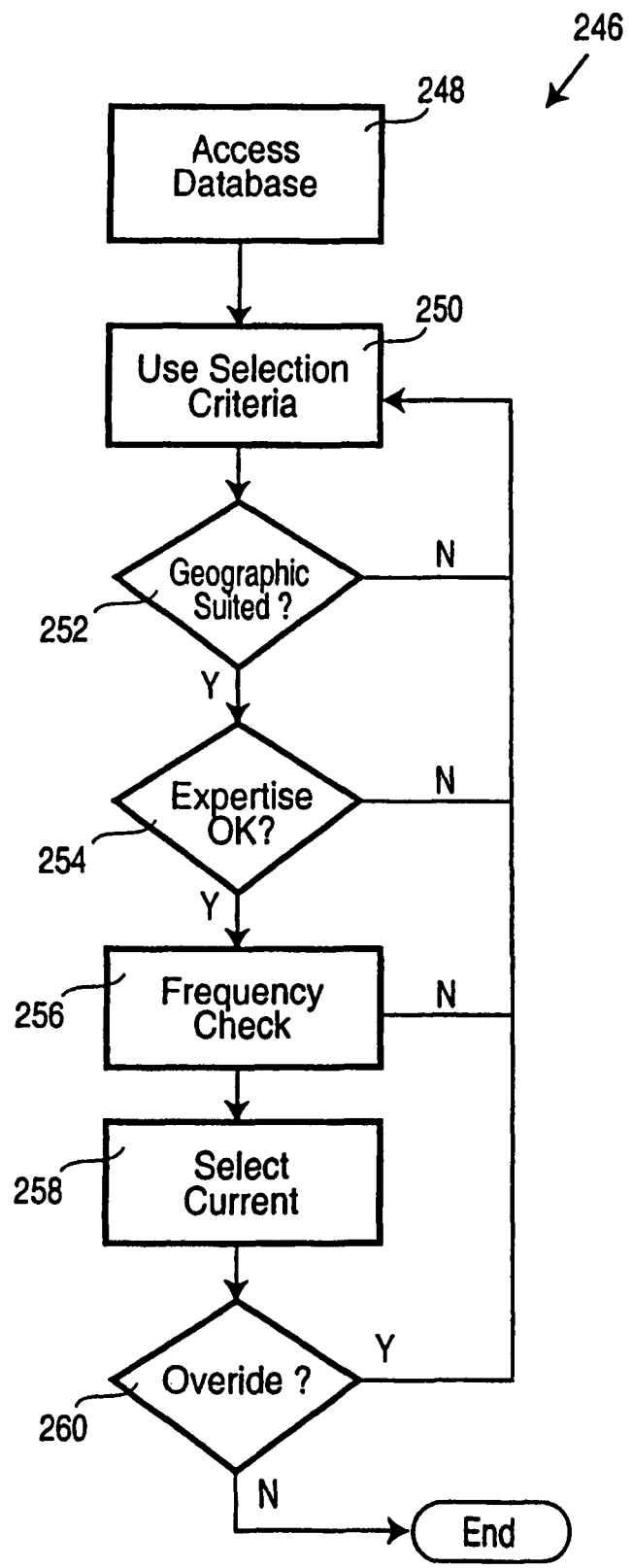
FIG. 8 shows a selection algorithm for the workflow of FIG. 7.

It should be noted that the referral process 212 can automatically select the provider PSP from the provider database 32 (see FIG. 1). Referring to FIG. 8, a selection algorithm 246 accesses 248 the database 32 through a plurality of selection criteria 250. The selection criteria 250 can include postal code matching 252 of the provider PSP and the worker 22 (geographic specific), provider expertise 254, provider selection frequency 256 for distributing a number of referrals among a group of eligible providers PSP, or any other combination of the above. It is recognised that other selection criteria can be used, if desired. Once the provider PSP is selected 258, the adjudicator 24a or other system administrator can override 260 the selection. It is also possible that the adjudicator 24a manually selects the provider PSP for the referral 202.

Referring to FIGS. 10-14, an example referral 202 is shown, including worker 22 details, employment profile, physical precautions, referral details, as well as provider details that can be determined by the algorithm 246 (see FIG. 8).

Figure 9:
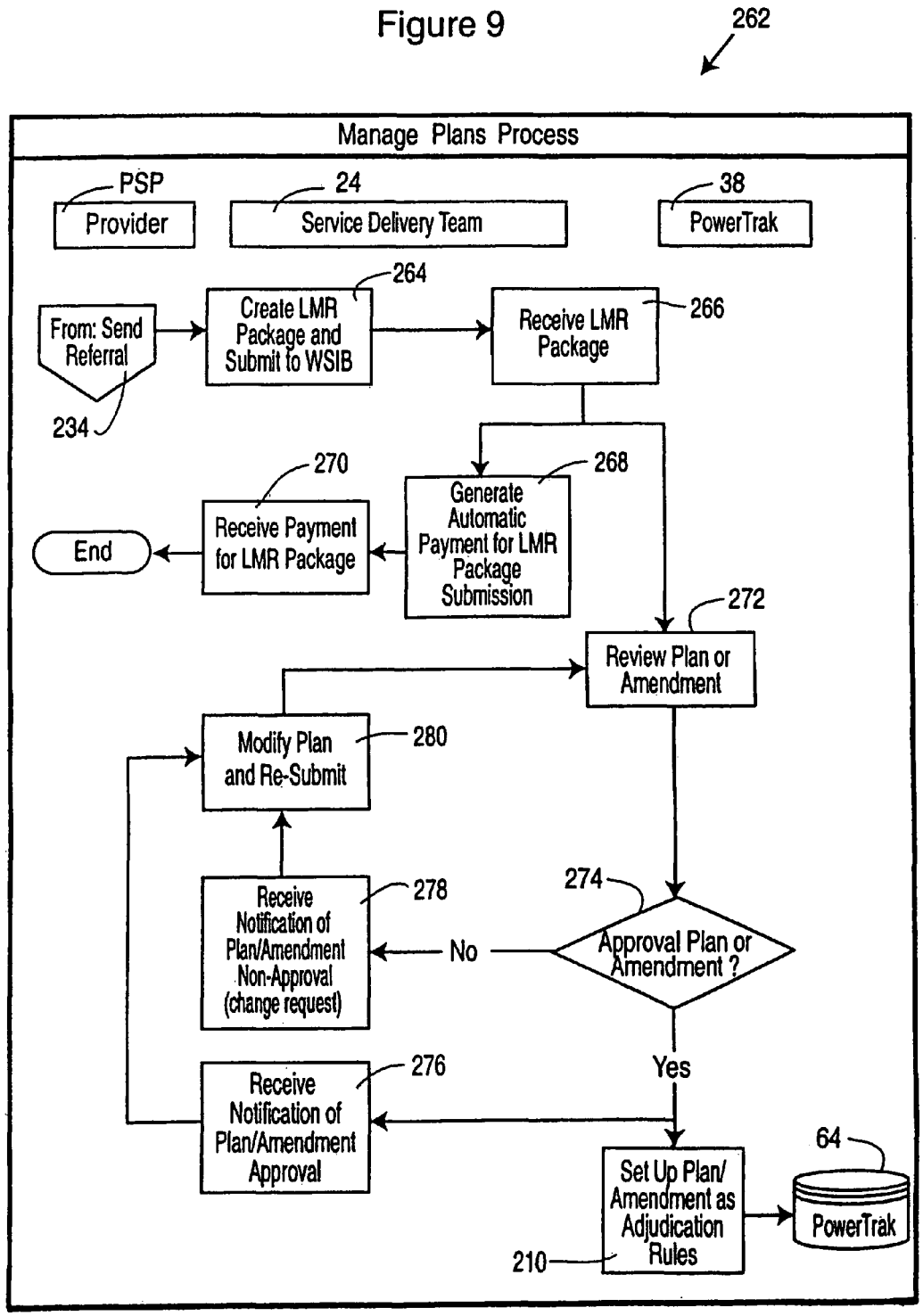
FIG. 9 is a manage plans workflow for the re-entry workflow of FIG. 6.

Referring to FIG. 9, a manage plans process 262 starts from the previous step 234 of the referral process 212. The provider PSP creates 264 the proposed plan 204 (see FIG. 6) and submits it through the interface 14 (see FIG. 1) to the management agency 24. The agency 24 then receives 266 the proposed plan 204. The agency 24 determines 268 a value for the proposed plan 204 and then sends payment 270 to the provider PSP for the plan set-up and what level of assessment has already been completed with the worker 22. Further, the agency 24 also reviews 272 the proposed plan 204 for suitability. If the plan 204 is approved 274, then the adjudication rules 210 are determined and sent to the rules database 64 for subsequent use in adjudicating LMR plan bills associated with the approved plan 206. The provider PSP is notified 276 of the approval. Otherwise, the plan 204 is declined and amended 274, and the provider PSP is notified 278 that changes are required before final approval. The provider PSP then modifies the plan 204 and resubmits 280 it for approval. This change process can continue until the plan 204 is finally approved 274.

Further activities by the provider PSP and management agency 24 for the process 262 include the provider PSP viewing the status of the submitted plan 204, 206, the provider PSP submitting plan 206 amendments as necessary after approval, the provider PSP viewing the balance remaining on approved plans 206, and the agency 24 changing the status of the plans 204, 206 (i.e. cancel, suspend, reactivate). In the case of changes or amendments of the approved plan, the rules 210 are also updated to reflect the changes. Further, during the amendment process of the plans 204, 206, all versions of the plans 204, 206 can be stored in the IBD 26 (see FIG. 2) for referral by the agency 24 to help in subsequent analysis of the plans 204, 206.

Therefore, as described above, the process 212 creates and sends the referral 202 to a selected provider PSP, who then either accepts or declines. Notification of the acceptance/ decline status is given to the agency 24. Further, it should be recognised that once the initial referral 202 is created, all subsequent status information of the referral 202 is stored in the IDB 26 (see FIG. 2) for review by interested parties of the system 10 through the interfaces 12, 14. Following acceptance of the referral 202, the provider PSP prepare and submit the proposed plan 204, which can consist of information pre-populated from the referral 202, an indication of the level of assessment completed with the worker, as well as details outlining the proposed program of care. After the plan 204 is submitted, the referring adjudicator 24a receives notification of the plan 204 and initial payment is given to the provider PSP base on the indication of the level of assessment completed. Therefore, it should be noted that the rules 210 are used by the adjudication engine 38 (see FIG. 2) to process the remaining level of assessment of the approved LMR plan 206 on a predictive basis.

The adjudicator 24a indicates initial adjudication results on the proposed plan 204, and have the option of either approving the plan 204 or requesting changes. The approved plan 206 triggers through the workflow engine 36 (see FIG. 2) the creation and submission of the payment rules 210 into the adjudication engine 38. These results are also accessible through the interfaces 12, 14 for interested parties. As discussed above, the providers PSP can also request amendment of the approved plan 206, however, preferably the initial level of assessment remains static. If amended, the adjudicator 24a is notified of the amendments and the amended plan 206 must be reapproved. It should be noted that the status and details of the amended plan 206 are stored in the IDB 26 (see FIG. 1) for access through the interfaces 12, 14. In the case of subsequent reapproval, the rules 210 are triggered for change and reinserted into the adjudication engine 38. Accordingly, the revised rules 210 replace the previous rule set 210. Further, the adjudicators 24a can change the status of the plan 206 at any time, such as to suspension or cancellation. This change in status is recorded in the IDB 26, as well as revised in the rules 210 to deactivate the payment associated with the plan 206. Conversely, the adjudicators 24a can also reactivate the plan 206, if suspended or cancelled, which will also trigger the revision of the rules 210 to reactivate the payment rules associated with the plan 206. It should be noted that this change in status is also recoded in the IDB 26. Accordingly, the interfaces 12, 14 can be used by interested parties (i.e. agency 24 members and providers PSP) to inquire about the status and other details concerning referrals 202 and plans 204, 206, as well as the actual dollar amounts approved/paid against the plan 206.

It is also recognised that members of the agency 24 can override any provider PSP selection, change the PSP, view a series of referrals 204 against associated valid claim numbers, and view plans 204, 206 and amendments for any valid claim number. Further, members of the agency 24 can also update LMR parameters of the system 10, including the referral algorithm 246 operation, the selection criteria 250, as well as expense codes and dollar limits used by the plans 204, 206.

Figure 15:
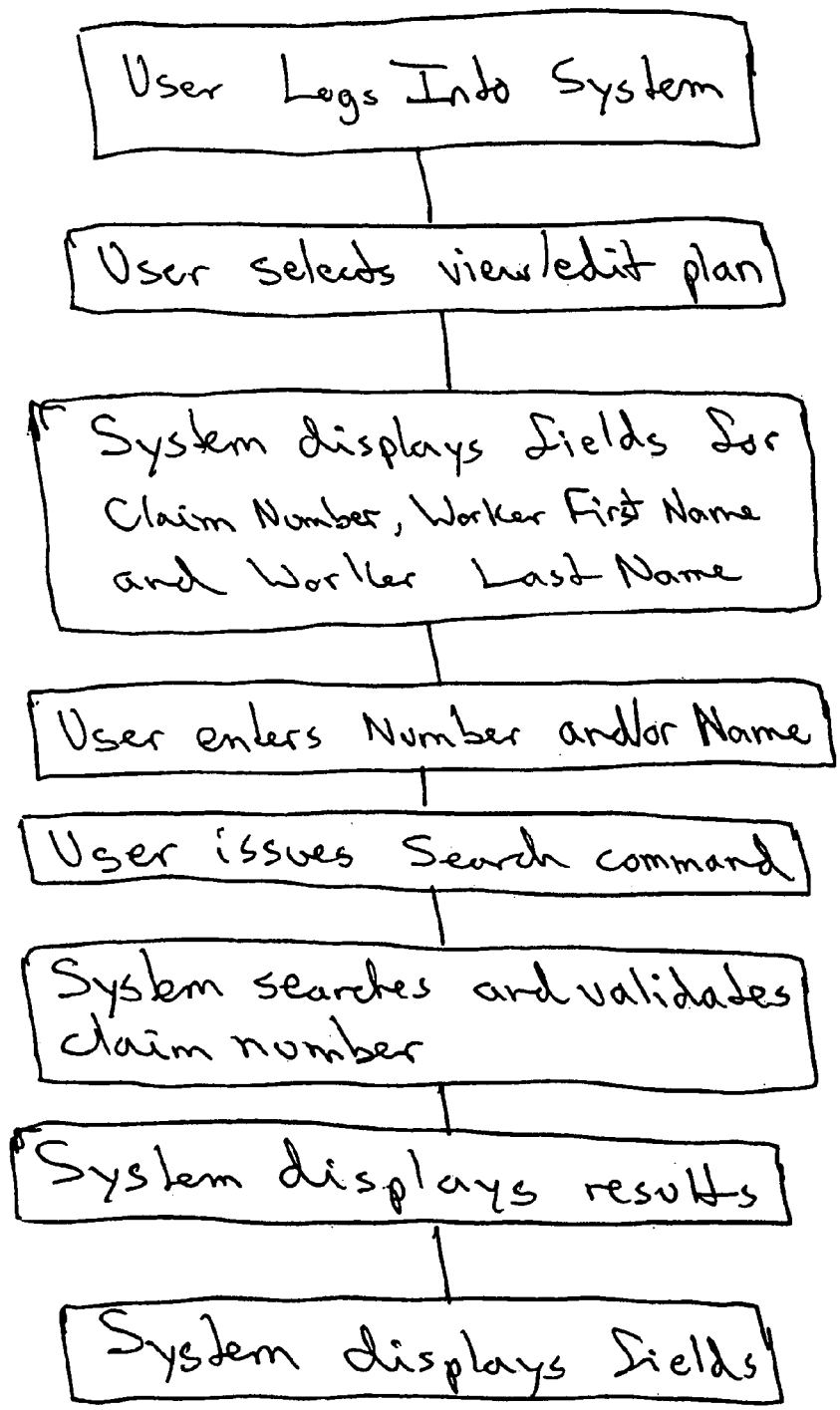
FIG. 15 shows a workflow for creating a plan for the workflow of FIG. 6.
Figure 17B:
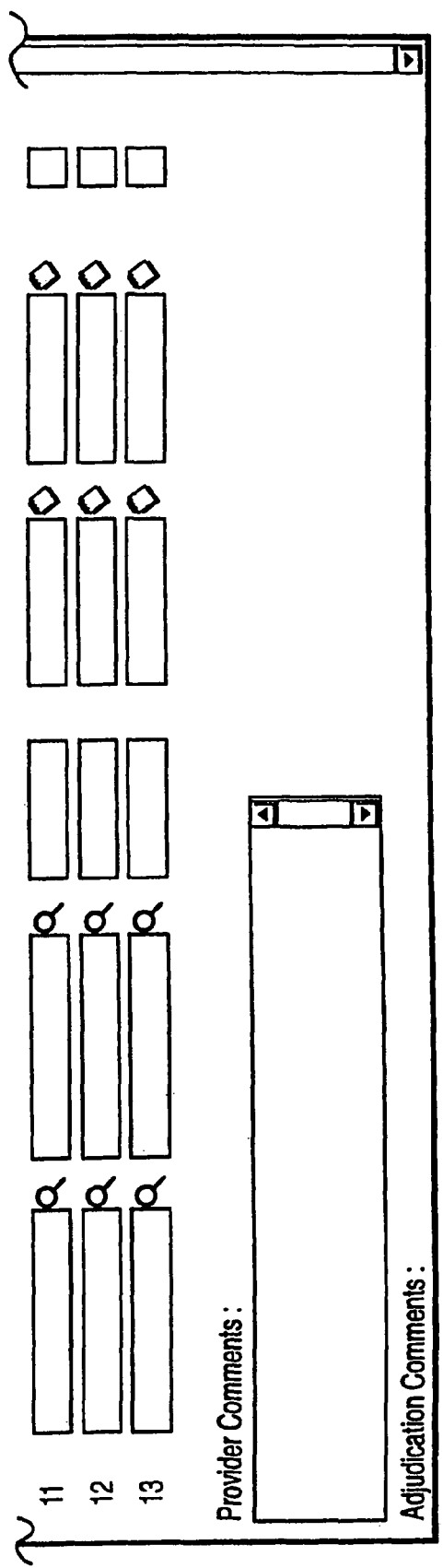
FIG. 17 shows a second graphical user interface for the workflow of FIG. 9.
Figure 18:
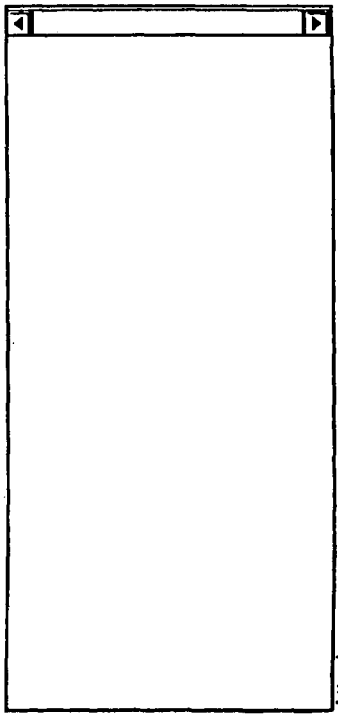
FIG. 18 shows a third graphical user interface for the workflow of FIG. 9.

Referring to FIG. 15, an example creation or editing of the plan 204, 206 is shown. An example plan 204, 206 is shown in FIGS. 16 to 20. In general, the creation of the plan 204, 206 includes:

1. User (of the provider 20 see FIG. 2) logs into the system 10 through the interface 14,
2. User selects the view or edit plan option,
3. System 10 displays the following fields: Claim Number, Worker First Name, Worker Last Name on the interface 14,
4. User enters worker's name and or claim #,
5. User issues a Search command,
6. System 10 searches for matching criteria and validates that the claim number is a valid claim number,
7. System 10 determines that the claim number is valid and displays the results to the user on the interface 14,
8. System 10 displays the following fields to the user for the specific claim number:

Section 1: Plan Header Tab (See FIG. 16)
Claim number
Claim status
Worker name (first and last)
Worker DOA
Desk ID
Plan ID
Plan Version
Plan Status
Date Plan Created
Plan Start Date
Plan End date
Plan Review Date
Plan Suspension Period
date Plan Last Modified
Plan Modified By
Section 2: Payment Details Tab (See FIG. 17)
Status
Service Code
Freq
Unit
Amount
Payment Start Date
Payment End Date
Payee Name
Section 3: Assessment Tab (See FIG. 19)
PCA Total Amount
CA Total Amount
Rationale Notes for assessment detail
Section 4: CEW Tab (see FIG. 19) provides a summary of the various cost categories and Section 5: View Payments Tab (see FIG. 20) provides summary of approved amounts once the plan 204 has been submitted and then reviewed by the adjudicator 24a (see FIG. 6).

In order to display the actual dollar amounts approved and/or paid against the plan 206, the facility to create a report called plan budget versus actuals is provided within the reporting and monitoring module (see FIG. 1). The name "actuals" refers to the actual dollar amounts paid. The plan versus actuals report uses details of the plan described above and stored in the integrated database. The report also uses information on the amounts paid which are also stored in the integrated database.

Figure 21:
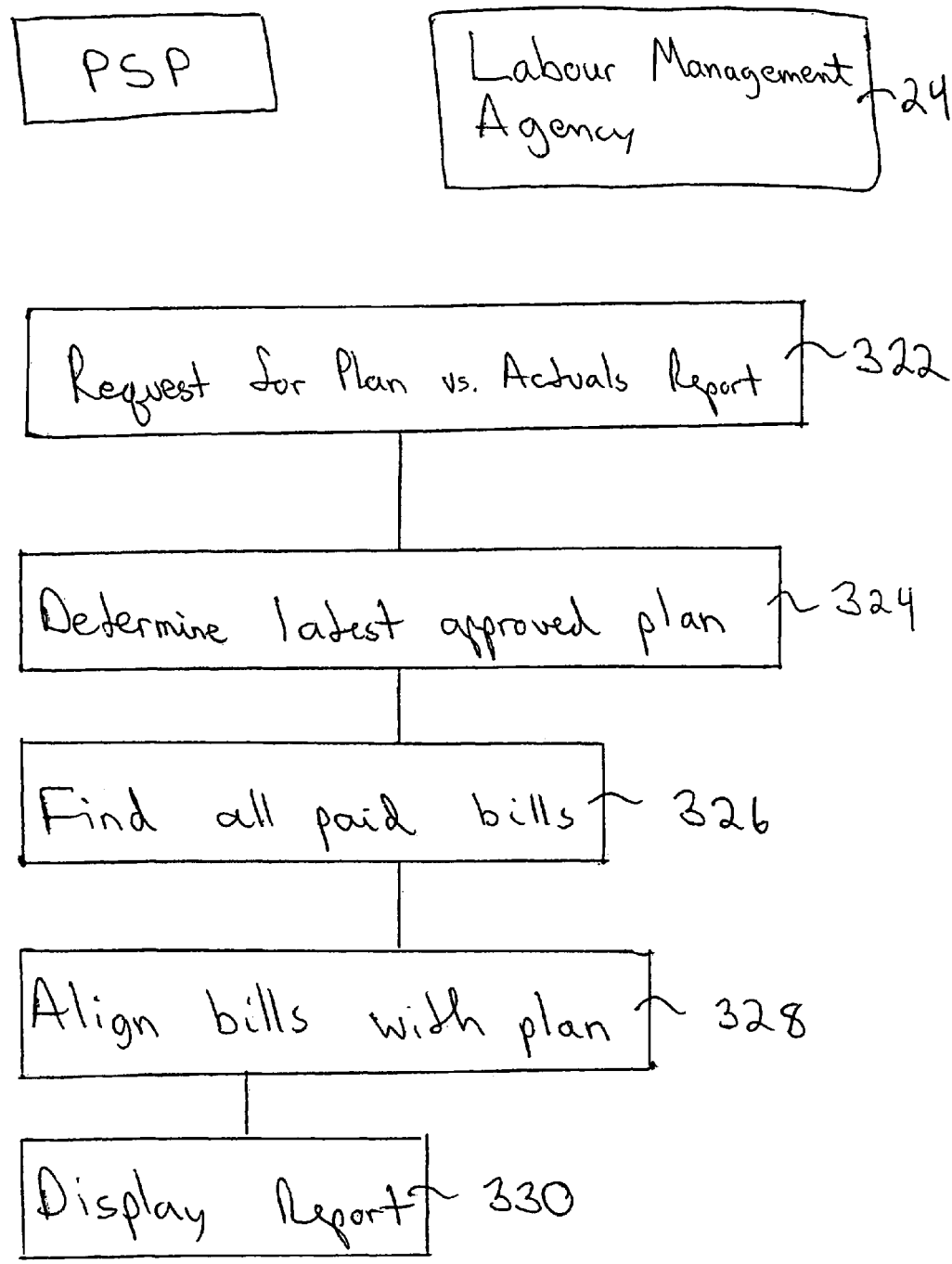
FIG. 21 shows a plan versus actuals report workflow for the system of FIG. 1.

Referring to FIG. 21, a workflow for creating a plan versus actuals report is shown generally by the numeral 320. A report may be requested by a primary source provider (PSP) or by the labour management agency (LMA) 24. At step 322, the PSP or the LMA requests the plan versus actual report. The request includes a claim number as an indication of the plan of interest. The plan budget versus actual report provides a view of the entire plan including budgeted amounts compared to paid amounts. To create the report, the system determines the latest approved plan at step 324. Although the plan is the "latest approved plan", the status of the plan may be "closed" or "expired" rather than "approved". The system then finds all paid bills for the claim indicated in the request at step 326. The claim number and service code on each bill will determine which section the bill will be counted against.

The system then aligns all the paid bills with the latest approved plan associated with the claim indicated in the request at step 328. The aligning process uses the bill service code to align bills with plan lines according to their service codes. The bill date of service (DOS) can be outside of the date range defined for the plan line service. The bill secondary service provider (SSP) can be different from the SSP defined for the plan line service.

Figure 22:
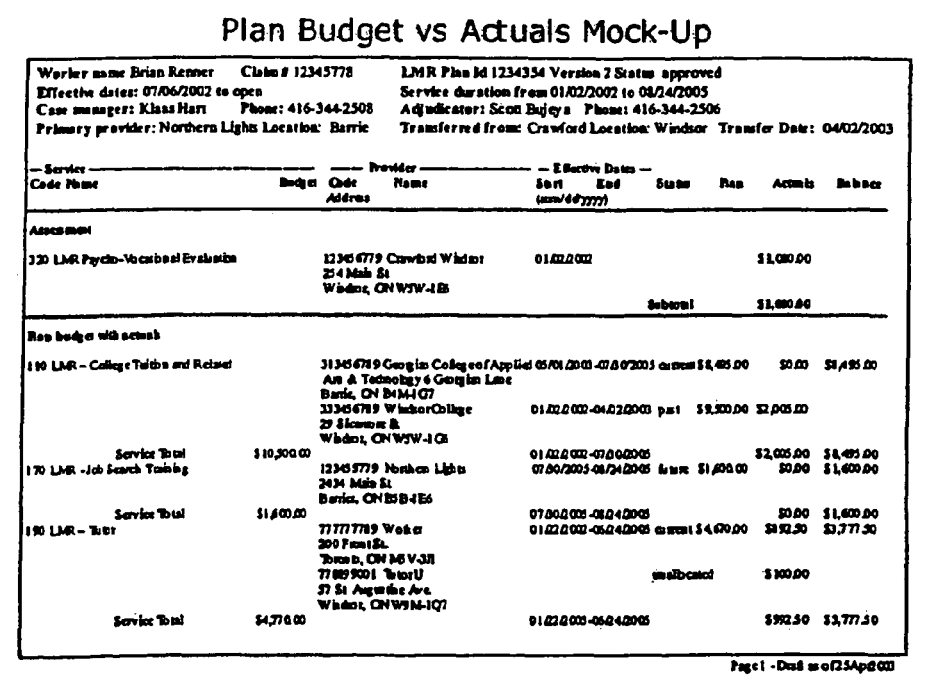
Figure 23:
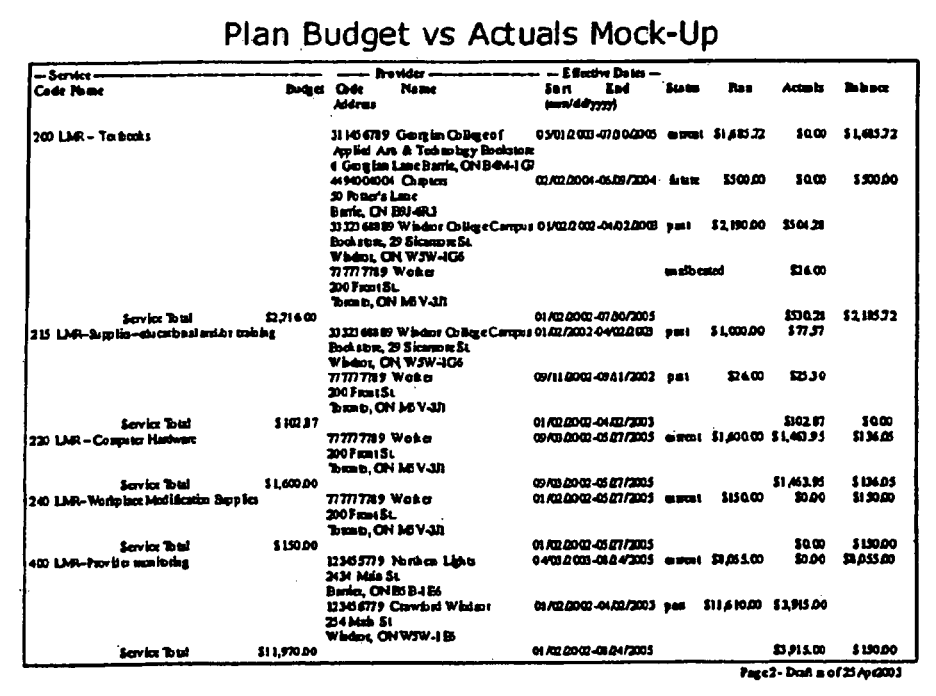
Figure 24:
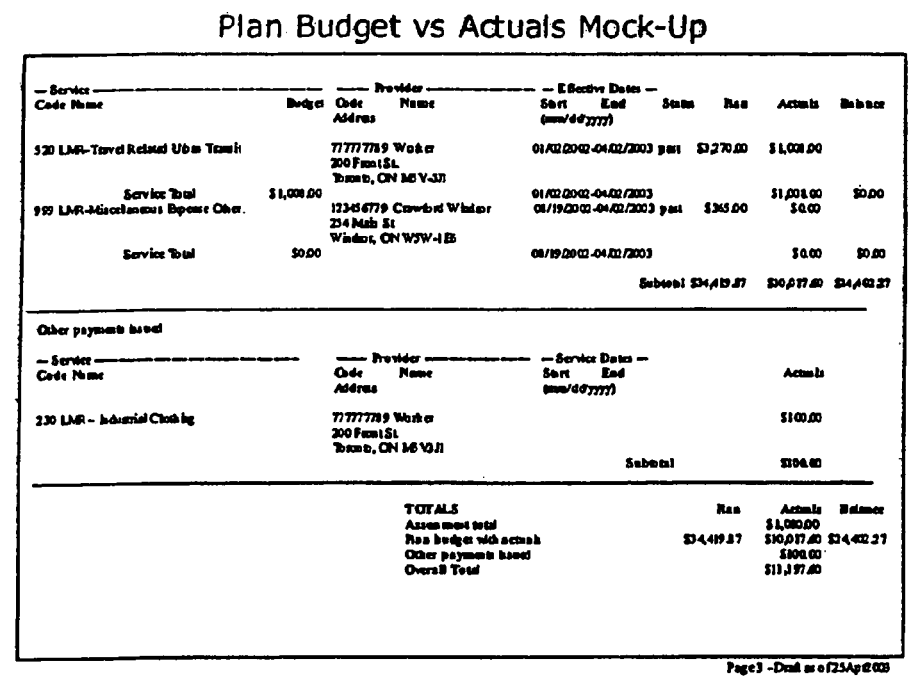

This system then displays the report at step 330. A sample report is shown at FIG. 22, 23, and 24. The report is displayed in two sections, namely, a header and a body. The header section includes the following information:

"As of": date the information that is displayed was updated

"Worker name": Last and First name of worker associated with the case

"Claim Number": claim number associated with the case

"Plan Id": LMR Plan Id generated by the system

"Version": Version of the LMR Plan

"Plan States": status of the LMR plan information displayed

"Effective Dates":
- From is the date when the plan was last approved
- To relates to plan Status:
  - Approved=open
  - Closed=date when the plan was closed
  - Expired=date the plan expired "Service Duration": the earliest start date of a service in the plan to the latest end date of a service in the plan. Note: Service duration can be outside the plan effective dates.

"Case Manager Name and Phone": Last and first name of Case Manager and phone

"Adjudicator Name and Phone": Last and First name of Adjudicator and phone

"Primary Provider and Location": Name of Primary service Provider and location (city)

"Transferred From", "Location" and "Transfer Date": when plan is transferred, the previous owner name, location (city) and date when plan is transferred. Transfer can be External (from another provider) or internal (from a different location or different Case Manager). If the case was not transferred, "n/a" will be displayed in these fields.

Within the body of the report are four sections, namely assessment, plan budget with actuals, other payments issued, and totals. The assessment section includes the services of transferable skill analysis, evaluation, and vocational evaluation. The report displays the service code and name of assessment services that have been paid automatically. The report also displays the code and name of the primary service provider associated with the auto-payment. Finally, the report shows the actual amount paid to the primary service provider. If no amount has been paid, then the message "no assessment" is displayed.

The plan budget with actuals section of the report displays all services in the latest approved plan with the actual amounts paid for each service grouped by secondary service provider (SSP). The report includes the service code and name according to the latest approved plan. The provider code, name and address according to the latest approved plan, the effective dates of the service according to the latest approved plan, the status of the service, the plan amount and the actual amount paid to the secondary service provider. The status of the service can be "current", "future", "past" or "unallocated". The status is "current" if the date is between the start date and end date of the plan line service. In this case, the "actuals" amount is the total of bills where the DOS is between the service start date and end date, the bill service is the same as the line service, and the bill SSP is the same as the line service SSP.

The status is "future" if the date is before the start date of the plan line service. In this case, the "actuals" amount is the total of all bills where the bill DOS is between the service start date and end date, the bill service is the same as the line service, and the bill SSP is the same as the line service SSP.

The status is "past" if the date is after the end date of the plan line service. In this case, the "actuals" amount is the total of all bills where the bill DOS is between the service start date and end date, the bill service is the same as the line service, and the bill SSP is the same as the line service SSP.

The status is "unallocated" if the bill service is the same as the line service, and the bill SSP is not the same as the service SSP or the bill DOS is outside of the range defined by the start date and end date of the plan line service or both.

Finally, the system calculates the balance remaining in the plan as the difference between the plan amount and the actual amount. For each separate service, the report includes a service total line which includes the total budget for that service and the actual amount paid for that service and the balance available for that service.

The other payment section of the report displays all payments made for services that are not in the latest approved plan. This section of the report displays the service code and name for payments made for a service outside of the latest approved plan, the code and name of the service provider associated with the payment, and the actual not paid. If there is no such payments then a message is shown saying "no other payments were issued."

The total section of the report shows the actual amount paid for assessments, the plan amount, actual amount and balance for the plan budget with actual section, the total of other payments issued, and an overall total of all actual amounts paid for the claim.

As discussed above, the predictive payment process 119 (see FIG. 6) is part of the system 10. The recurring payment requests associated with the LMR plans 206 are used in the administration of worker 22 claims in order to support the bill adjudication 38 process. There are four major functions used in the system 10 and associated process 199, including creation of a predictive payment, the modification of a predictive payment, searching for existing predictive payments, and a bill generation process. These functions are coordinated through the interfaces 12, 14 (see FIG. 1).

Figure 26:
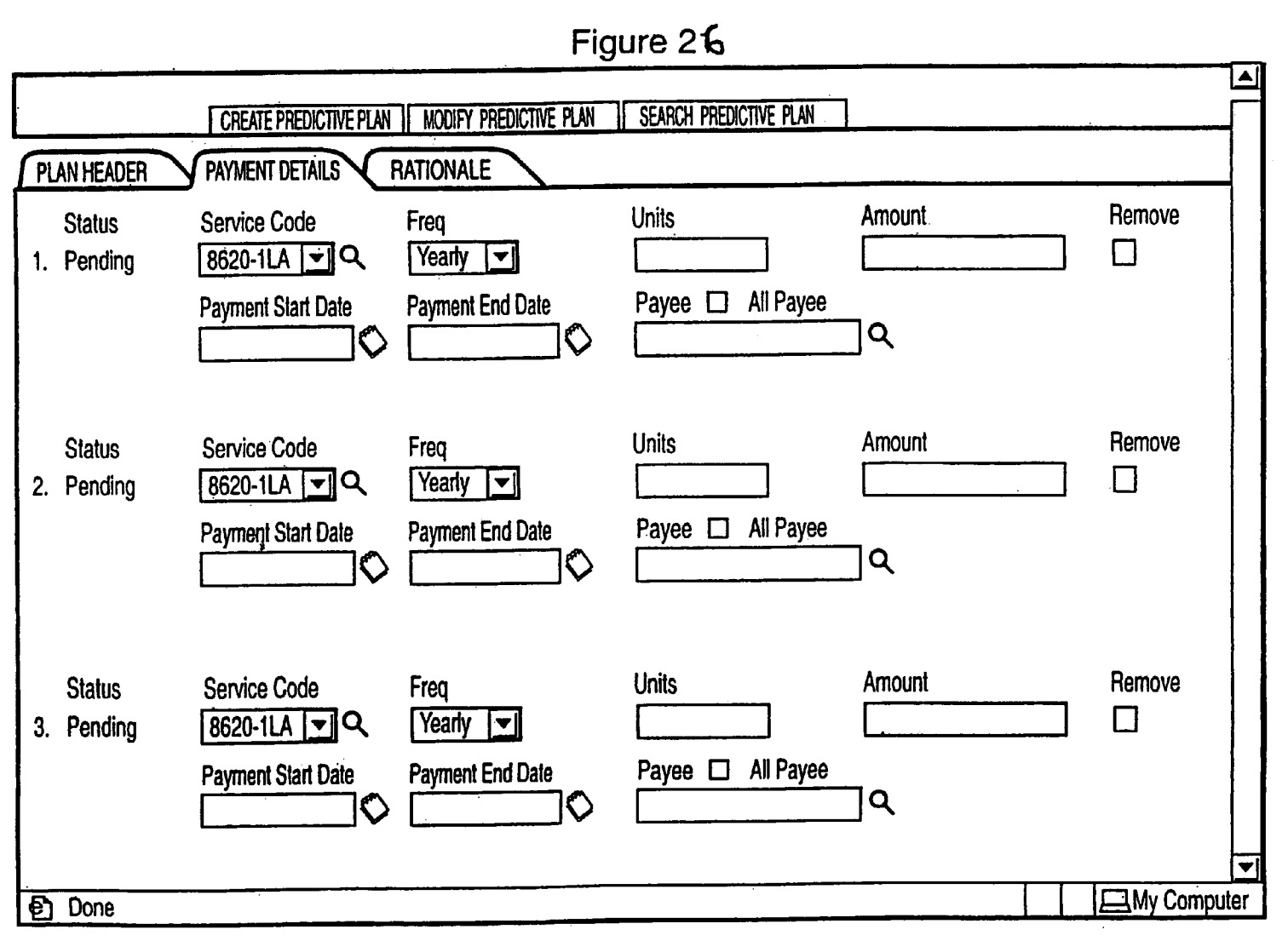

Referring to FIG. 26, the following steps are performed to create a predictive payment:

1. The Plan 206 Start Date is auto-populated based on the earliest payment start date on the that will be entered on the Plan Detail tab;
2. The Plan End Date can be automatically populated by the system to 5 years, for example, from the Plan Start Date. This date can be modified by the user to a date other than the preset date, if desired;
3. The system will auto-populate the Plan Review Date to 12 months, for example, prior to the Plan End Date;
4. Next the user moves to the Payment Detail tab of the page (see FIG. 26) and begins building the plan 206;
5. User selects the appropriate service code. User may select the service code from the predefined pick list which will highlight their selection to flag to the user what they have chosen or they may click the Other Service Code icon which will open the scope of the service code search to all service codes. The user can search for the service code based on keyword and or by service code number;
6. System 10 displays the selected service code in the Service Code field. The service code description will be displayed below the service code field. System will determine if selected service code belongs to a predefined group or "bundle" and will automatically pre-populates the next detail line items with all the service codes within that "bundle";
7. User moves to the Frequency field and indicates the appropriate frequency from the predefined pick list (if required, this is a mandatory field but is sometimes populated by system logic);
8. System 10 highlights and displays the user's frequency selection in the pick list;

9. User moves to the Unit field and enters the numeric number of units to help determine the dollar value of the payment. For example, the unit value entered is equivalent to the total number of hours allowed for that service per month;
10. User moves to the Amount field and enters the dollar amount of the payment (if required, this is a mandatory field but is sometimes populated by system logic) and is displayed to the user.
11. User moves to the Payment Start Date and enters the date that the first bill should be generated to begin the recurring payment cycle. A calendar icon can be available to the user in order to facilitate the user in the date selection process;
12. User moves to the Payment End Date and if needed alter the default date of Dec. 31, 9999 that the last bill should be generated to end the recurring payment cycle. A calendar icon can be available to the user in order to facilitate the user in the date selection process;
13. The payee field can be pre-populated with the worker's 22 name, however, the user may change payee as required (i.e. to the worker's trustee.) by moving to the Payee field. User can click on the Payee icon so that they may search for the appropriate payee. The user will be able to search for the payee based on their name (first and or last) and or Provider TIN# which will have already been set up for the payee whether they be a worker, supplier, provider or third party;
14. System 10 will display the full address of the Payee to the user, the user will click on the payee ID and the system will populate the payee field in the Payment request Section with the full name of the payee;
15. It is assumed that the payee will be the same for all of the payment requests. Once Payee field has been changed, the system 10 will make active a checkbox entitled All Payee, which will be checked. The user can uncheck this checkbox which means that for every payment detail they now enter for the plan 206, a payee will have to be selected and all payee name fields on the page will be deleted;
16. User may repeat steps 10-21 for every different payment request 304 they wish to set up for this predictive payment plan 206;
17. System 10 will also allow the user to "de-select" a payment detail automatically created based on service groupings (Step 13);
18. User moves to the Rationale Tab of the page and if needed in the Rationale Notes field enter any additional information. The system will pre-populate the PCA Total Amount and CA Total Amount fields. The CA Total Amount is equal to the total amount of clothing allowance paid per year to the worker (system 10 adds all clothing allowance service codes to be paid for the year). This amount does not include arrears amount. The PCA Total Amount is equal to the total amount of Personal Care Allowance paid per month (system 10 adds up all PCA service codes to be paid for the month into one amount). This amount does not include arrears amount;
19. User issues the Save command. System saves the information to the database and the predictive plan is successfully saved with a status of "Pending" allowing the user to save a partially completed plan. To activate the plan 206, user will go to the Modify Plan option and completed all required information;
20. User issues the Submit command on the Rationale tab;
21. System 10 can run validation checks for completeness on mandatory fields and format of data entered into all fields that require population by a user and ensuring that no duplicate payment requests have been created;
22. System 10 saves the information to the database 26 (see FIG. 2) and the predictive plan 206 is successfully saved as "Active".

The create predictive payment process involves the set up of one or many predictive payment requests by the rules 210 for the purposes of the predictive payment plan for the worker 22 claim. The modify predictive payment process involves the application of the administrative practices of a payor to the existing predictive plan structure they have defined for a worker 22 claim. These modifications may include the following changes: modify service code; modify frequency; modify payment amount; modify start and end dates; modify units (where applicable); and modify payee. These items are included in the LMR DB 64 (see FIG. 2) as the series of payment rules 210, which are imported into the adjudication engine 38 once the plan is confirmed. The search process involves retrieving and displaying information about the predictive payment plan 206 for the worker 22 claim based upon user specified criteria through the interfaces 12, 14, which can be used to obtain up to date information on the status and activity of the plan 206 as stored in the IDB 26 (see FIG. 2). The bill generation process involves the triggering of bill creation based on parameters defined during the predictive payment plan 206 maintenance (create and modify) processes. The bill generation process will apply logic through the workflow engine 36 and the adjudication and payment engines 38, 40 so that recurring payment requests will occur, which are associated with the details of the approved plan 206 and corresponding rules 210.

There are three main concepts that make up the functionality of the Predictive Payment process 119 as implemented on the system 10; namely referral, maintenance of predictive payment plans 206, and generation of bills from predictive payment plans 206. The predictive payment plan 206 (or PPP) is a collection of one or more payment requests with corresponding payment parameters such as amount, frequency, start and end dates, which are then organized in a structure for the purposes of plan definition. From the plan definition the bill generation process will then be triggered to generate bills for specific payees as per the specified frequencies and start and end dates for the payment requests that are specified in the plan 206. The PPP is comprehensive meaning that it will include all of the predictive payment requests that a worker 22 claim needs in order to be able to build plans 206. The predictive payment plan 206 contains at least one predictive payment request and at least one payee.

Figure 25:
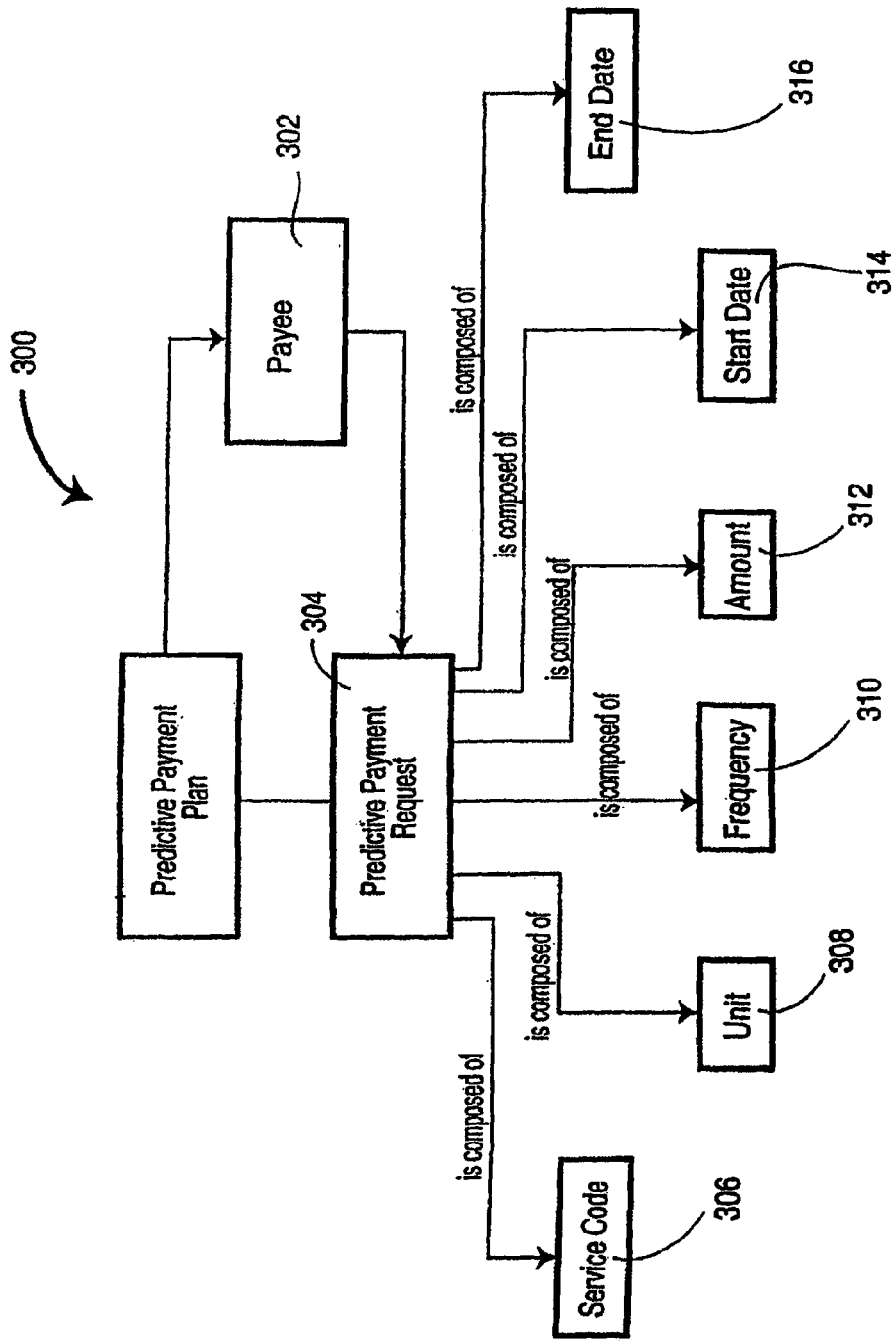
FIG. 25 shows the components of a predictive payment request for the system of FIG. 1.

Referring to FIG. 25, a Predictive Payment detail 300 includes the plan that interacts through a payee 302 with the predictive payment request 304 (embodied in the rules 210, see FIG. 6). The payment request 304 identifies a service code 306, frequency 308, units 310, amount 312, and payment request start 314 and end 316 dates. For example, the agency 24 will determine that the worker 22 claim is entitled to a Personal Care Allowance and will then set up a predictive payment request 304 by the rules 210, which will allow a recurring payment to be sent to the specified payee 302. The agency 24 can indicate during the creation process which Personal Care Allowance code the worker 22 will receive reimbursement for, the frequency for which the worker will receive reimbursement, the number of units, the amount of the reimbursement, and the start date and end date for the reimbursement period. The payee 302 identifies who will receive reimbursement for the predictive payment request or requests 304. The agency 24 may indicate at the plan level the payee 302 if all the payment requests 304 go to the same payee 302 or if there are multiple payees 302 per each payment request then the agency 24 can indicate the payee 302 for each individual payment request 304. The payee may be the worker 22, an equipment/service supplier (such as an SSP), the provider PSP, or any other third party.

Figure 27:
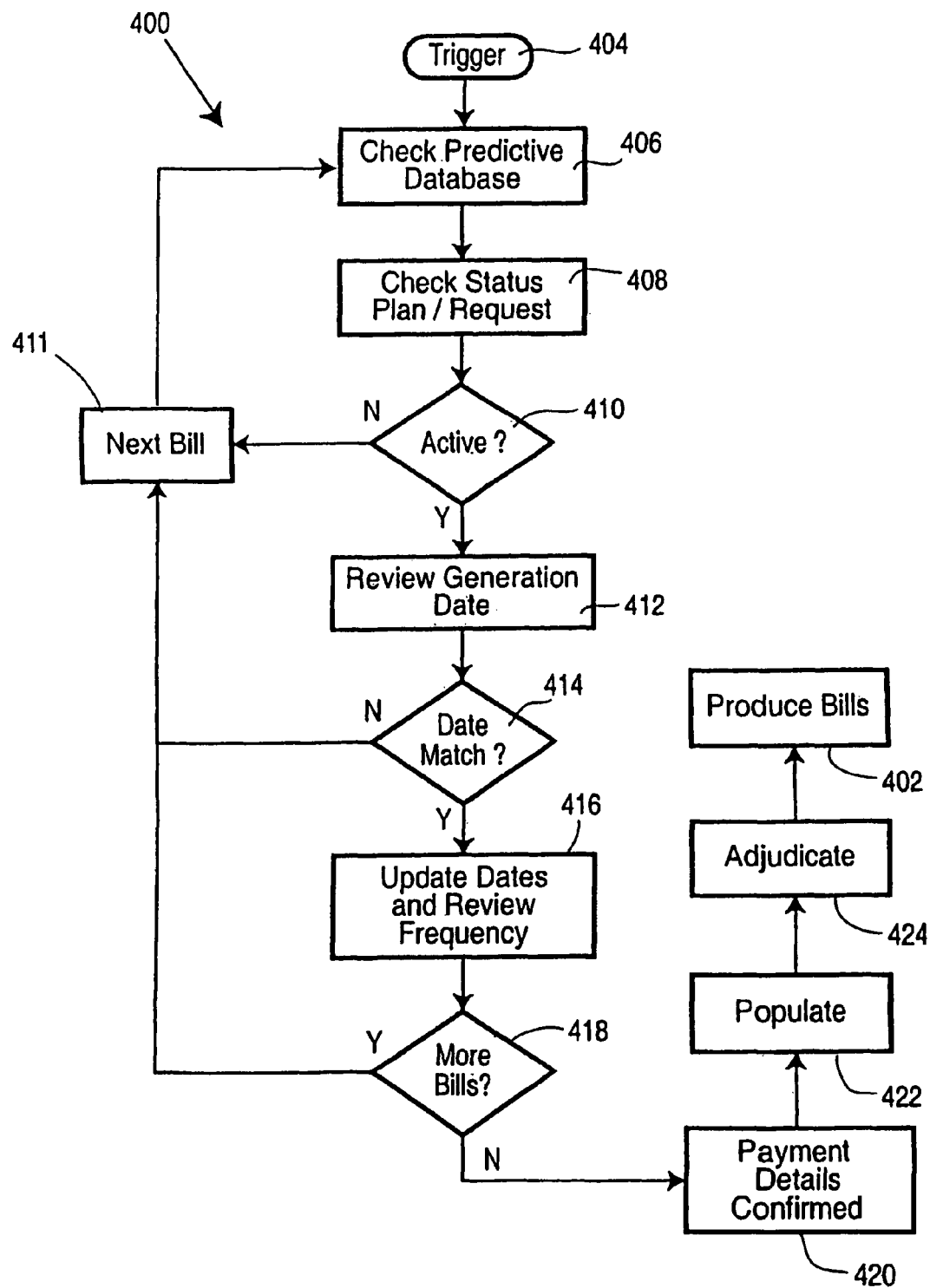
FIG. 27 is a bill generation workflow of the system of FIG. 6.

Referring to FIGS. 2 and 27, once the LMR UR rules DB 64 information has been inserted into the adjudication engine 38, in response to the approved plan 206 (see FIG. 6), generation of bills 402 from the predictive payment requests 304 (see FIG. 25) can begin. The bill generation process 400 applies logic through the workflow engine 36 at a predetermined time/schedule on a daily basis, for example, to retrieve predictive payment details (corresponding to the payment requests 304 of the plans 206) from the Bill Scheduling database 62. The predictive bill data of the database 62 is reformatted by the workflow engine 40 and then inserted into the bill adjudication queue 48, for eventual LMR bill 402 creation and submission into the adjudication engine 38 for adjudication. The adjudication of these LMR bills 402 provides the payment engine 40 with payment details, which are used to issue payment by the system 10 to the providers PSP in response to the predictive elements of the corresponding plan 206. The process 400 uses the parameters of the payment request(s) 304 within the plan 206 to determine what data to insert into the payment bill entity. The process 400 also applies logic in order to determine the required number of bills to be generated based on the payee combinations for the predictive payment plan 206, for example coordination of benefits (COB) that are part of the plan 206 as well as direct payment to the worker 2 and SSPs if desired. The bill generation process 400 can use standard fields and values, such as the 837 EDI import process.

Referring to FIG. 27, the bill generation process 400 is run on a predefined frequency in order to pick up from the database 62 and send bill payment requests 304 that run on user defined anniversary dates, as well as being able to run on specific set dates. The trigger for the bill generation will be the parameters 306, 308, 310, 312, 314, 316 in the predictive payment plan (see FIG. 25). Accordingly, the automatic generation of the LMR bills 402 involves the coordinated effort between the workflow engine 40 and the contents of the IDB 26, as well as the procedures 70, 72, 74, 68 as discussed above (see FIG. 2).

Referring again to FIG. 27, the process 400:
1. uses the system 10 through the workflow engine 40 to trigger 404 the bill generation to start on a daily basis or other predefined period;
2. the system 10 checks 406 the Predictive Payment schema in database 62 of the IDB;
3. the system checks 408 each predictive payment plan stored in system 10 for an Active status;
4. for each plan that is active the system 10 also checks 408 to see that all payment requests 304 are Active;
5. if any payment requests 304, are not active 410 the bill generation process 400 does not use them for bill generation and proceeds to the next 411 bill;
6. for each active plan with active payment requests 304 the system 10 checks 412 to see what date is contained in a Next Bill Generation Date column of the scheduling data in the database 62;
7. if the date contained in the Next Bill Generation Date column is equal/matches 414 to the current date then the system 10 flags that for this plan and payment requests 304 the system 10 must generate the bill 402;
8. once the system 10 flags that the bill 402 is required for this plan and payment requests 304 it moves 416 the date in the Next Bill Generation Date column to a Last Bill Generation Date column, hence updating 416 the bill generation frequency;
9. next the system 10 looks at a Frequency parameter for that payment request 304 and calculates what date the next bill 402 needs to be generated on and inserts that date value into the Next Bill Generation Date column;
10. the system checks 418 for other bills 402 and steps 6-9 are repeated by the system 10 until it has collected all of the payment requests 304 that require each of the bills 402 to be generated for specific plans 206;
11. next the system 10 evaluates if one or more bills 402 are required to be generated that day/period for that plan by confirming 420 the payment details in steps 12-15;
12. the system 10 checks an All Payee flag for each potential bill 402;
13. if the All Payee flag is set then the system 10 will skip to step 16;
14. if the All Payee flag is not set then the system 10 looks at a payee id parameter, which denotes the identity for different payees;
15. for each different payee id per payment request 304 for that plan the system 10 can create a different bill 402;
16. once the system 10 has determined how many bills 402 are required for one plan, it begins populating 422 the bill export table 48 in the IDB 26 with the parameters stored in the predictive payment schema of the bill scheduling database 62;
17. once the system 10 has completed inserting all the bill 402 data into the bill export table 48 in the IDB, the bill generation process is completed and the query bills procedure 70 is used by the workflow engine 40 to import the LMR bills 402 into the adjudication engine 38 for adjudication 424 and eventual bill 402 generation.

It should be noted that information on the processing/payment history of the bills 402 is stored in the IDB for subsequent access through the interfaces 12, 14. Further, when the predictive payment plan 206 or one of the service codes 306 within the predictive payment plan has moved from suspend to reactivate status, the system 10 determines the start and end date of the suspension period and determines if during this time the corresponding bill 402 was not generated. For example, an activation date can be provided by the user to determine date range for bill generation for the suspended period. Preferably, if no activation period is supplied, the bill generation process 400 will assume that the reactivation period will be the full suspension period.

Although the invention has been described with reference to certain specific embodiments, various modifications thereof will be apparent to those skilled in the art without departing from the spirit and scope of the invention as outlined in the claims appended hereto.

We claim:

1. A method executed within an electronic bill processing network for coordinating the submission and processing of a predictive based electronic invoice according to predictive payment data of an insurance plan, the predictive based electronic invoice including a request for payment for insurance services defined in the insurance plan, the method comprising the steps of:

storing, in a memory of a database coupled to an adjudication engine, the predictive payment data corresponding to the insurance plan, the contents of the insurance plan including definitions for a plurality of valid insurance services and including corresponding valid expenses for performing each of the plurality of valid insurance services;

triggering generation of the predictive based electronic invoice at a predefined interval according to a predictive payment parameter, the electronic invoice including the predictive payment data represented in the contents of the insurance plan;

inserting the predictive based electronic invoice in a queue of the memory for eventual adjudication of the predictive payment data;

providing from the queue the predictive based electronic invoice to the adjudication engine for processing; and upon recognizing completion of processing of the predictive based electronic invoice, generating a processing result of the predictive based electronic invoice as defined by the predictive payment data once adjudicated.

2. The method according to claim 1, wherein the queue has a plurality of electronic invoices including direct electronic invoices and the predictive based electronic invoice.

3. The method of claim 2, wherein the plurality of electronic invoices in the queue are both read and write accessible via a provider interface configured for receiving an inquiry invoice request including a search parameter from a respective provider of a plurality of providers, the search parameter for use in identifying from the plurality of electronic invoices an invoice matching the search parameter.

4. The method of claim 3 further comprising the step of limiting a degree of access of the plurality of electronic invoices by said read and write accessible by various individual access levels.

5. The method of claim 4, wherein the degree of access is determined by role based features of the individuals.

6. The method of claim 4, wherein the degree of access permits sequential rather than parallel editing of the plurality of electronic invoices.

7. The method of claim 2, wherein the provider interface is configured to save an electronic invoice of the plurality of electronic invoices as a draft invoice subject to future editing and submission.

8. The method according to claim 1, wherein the predictive payment parameter is part of a parameter set defined in the predictive payment data of the insurance plan, the parameter set including at least one parameter selected from the group comprising: the predefined interval; service codes; expense codes; payment amounts of the valid expenses; payment frequency; start and end dates for the generation of the electronic invoice; units; and payee information.

9. The method of claim 1, wherein the plurality of valid insurance services include services selected from the group comprising: a service; a treatment and a product.

10. The method of claim 1 further comprising the step of using a scheduling table in coordinating scheduling of the predictive based electronic invoice with respect to other electronic invoices for processing by the adjudication engine, wherein the contents of the scheduling table facilitate implementation of a scheduling action selected from the group comprising: hold the predictive based electronic invoice for additional action before insertion into the queue; and direct insertion into the queue.

11. A computer based network system for coordinating the submission and processing of a predictive based electronic invoice according to predictive payment data of an insurance plan, the predictive based electronic invoice including a request for payment for insurance services defined in the insurance plan, the system comprising:

a storage for storing the predictive payment data corresponding to the insurance plan, the contents of the insurance plan including definitions for a plurality of valid insurance services and including corresponding valid expenses for performing each of the plurality of valid insurance services;

a scheduling module configured for use in triggering generation of the predictive based electronic invoice at a predefined interval according to a predictive payment parameter, the predictive based electronic invoice including the predictive payment data represented in the contents of the insurance plan;

a queue of the memory configured for receiving the predictive based electronic invoice for eventual adjudication of the predictive payment data; and an adjudication engine configured for receiving the predictive based electronic invoice from the queue for processing and for generating a processing result of the predictive based electronic invoice once adjudicated.

12. The system according to claim 11, wherein the queue has a plurality of electronic invoices including direct electronic invoices and the predictive based electronic invoice.

13. The system of claim 12 further comprising a provider interface, wherein the plurality of electronic invoices in the queue are both read and write accessible via the provider interface configured for receiving an inquiry invoice request including a search parameter from a respective provider of a plurality of providers, the search parameter for use in identifying from the plurality of electronic invoices an invoice matching the search parameter.

14. The system of claim 13, wherein the provider interface is configured for limiting a degree of access of the plurality of electronic invoices by said read and write accessible by various individual access levels.

15. The system of claim 14, wherein the degree of access is determined by role based features of the individuals.

16. The system of claim 14, wherein the degree of access permits sequential rather than parallel editing of the plurality of electronic invoices.

17. The system of claim 12, wherein the provider interface is configured to save an electronic invoice of the plurality of electronic invoices as a draft invoice subject to future editing and submission.

18. The system according to claim 11, wherein the predictive payment parameter is part of a parameter set defined in the predictive payment data of the insurance plan, the parameter set including at least one parameter selected from the group comprising: the predefined interval; service codes; expense codes; payment amounts of the valid expenses; payment frequency; start and end dates for the generation of the electronic invoice; units; and payee information.

19. The system of claim 11, wherein the plurality of valid insurance services include services selected from the group comprising: a service; a treatment and a product.

20. The system of claim 11 further comprising a scheduling table in the storage for use in coordinating scheduling of the predictive based electronic invoice with respect to other electronic invoices for processing by the adjudication engine, wherein the contents of the scheduling table facilitate implementation of a scheduling action selected from the group comprising: hold the predictive based electronic invoice for additional action before insertion into the queue; and direct insertion into the queue.

* * * * *